(12) United States Patent
Hamaguchi et al.

(10) Patent No.: US 8,681,688 B2
(45) Date of Patent: Mar. 25, 2014

(54) RADIO COMMUNICATION METHOD, RADIO COMMUNICATION SYSTEM, AND RADIO TRANSMISSION APPARATUS

(75) Inventors: Yasuhiro Hamaguchi, Osaka (JP); Minoru Kubota, Osaka (JP); Hideo Namba, Osaka (JP); Shimpei Toh, Osaka (JP); Kazunari Yokomakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 557 days.

(21) Appl. No.: 12/677,742

(22) PCT Filed: Sep. 12, 2008

(86) PCT No.: PCT/JP2008/066532
§ 371 (c)(1),
(2), (4) Date: Mar. 11, 2010

(87) PCT Pub. No.: WO2009/035076
PCT Pub. Date: Mar. 19, 2009

(65) Prior Publication Data
US 2010/0215080 A1     Aug. 26, 2010

(30) Foreign Application Priority Data

Sep. 12, 2007   (JP) ................................ 2007-236422

(51) Int. Cl.
*H04B 7/185*     (2006.01)

(52) U.S. Cl.
USPC ........................................................ 370/318

(58) Field of Classification Search
USPC ............ 370/208–215, 318; 375/260; 455/522
See application file for complete search history.

(56) References Cited

U.S. PATENT DOCUMENTS 6,359,874 B1   3/2002  Dent
7,948,960 B2   5/2011  Okamoto
(Continued)

FOREIGN PATENT DOCUMENTS

EP   1 775 901 A1   4/2007
EP   1 876 741 A1   1/2008
(Continued)

OTHER PUBLICATIONS

Koizumi et al. "Mishiyo subcarrier ga Sonzai suru Baai no CI/OFDM PAPR Tokusei", Proceedings of the 2006 IEICE General conference Tsushin 1, Mar. 8, 2006, p. 454, B-5-101.

(Continued)

*Primary Examiner* — Hassan Kizou
*Assistant Examiner* — Ashil Farahmand
(74) *Attorney, Agent, or Firm* — Birch, Stewart, Kolasch & Birch, LLP

(57) ABSTRACT

A transmission apparatus according to the present invention includes: an encoding section; a modulation section; a variable-SF spreading section that performs spreading with variable SF according to control information A from a control section; an IDFT section that performs IDFT on output from the spreading section; a GI inserting section; a parallel/serial conversion section that converts output from the GI inserting section into a serial data sequence; a digital/analog conversion section; and an RF section that transmits a signal from an antenna after converting the signal to a frequency band for analog signal transmission and controlling it to an appropriate transmission power. The control section is configured to generate control information A for determining the variable SF and input the information A to the variable-SF spreading section and the RF section. In control information A, SF is varied depending on transmission power required.

7 Claims, 18 Drawing Sheets

(56) References Cited

U.S. PATENT DOCUMENTS

| | | |
|---|---|---|
| 7,983,357 B2 | 7/2011 | Kim et al. |
| 2001/0024427 A1 | 9/2001 | Suzuki |
| 2004/0071078 A1 | 4/2004 | Sudo |
| 2004/0174812 A1 | 9/2004 | Murakami et al. |
| 2004/0228283 A1* | 11/2004 | Naguib et al. ............ 370/252 |
| 2004/0258098 A1 | 12/2004 | Ohkubo et al. |
| 2005/0180313 A1* | 8/2005 | Kim et al. ............ 370/208 |
| 2006/0133526 A1 | 6/2006 | Zhang et al. |
| 2006/0187887 A1 | 8/2006 | Kim et al. |
| 2007/0041311 A1* | 2/2007 | Baum et al. ............ 370/208 |
| 2007/0110176 A1 | 5/2007 | Wu et al. |
| 2007/0140377 A1 | 6/2007 | Murakami et al. |
| 2007/0189406 A1* | 8/2007 | Kim et al. ............ 375/260 |
| 2007/0211807 A1 | 9/2007 | Han et al. |
| 2008/0039129 A1 | 2/2008 | Li et al. |
| 2008/0144552 A1 | 6/2008 | Johansson et al. |
| 2009/0129493 A1 | 5/2009 | Zhang et al. |
| 2009/0147748 A1 | 6/2009 | Ofuji et al. |
| 2009/0232194 A1 | 9/2009 | Yoshida |
| 2012/0044953 A1 | 2/2012 | Kishigami et al. |

FOREIGN PATENT DOCUMENTS

| | | |
|---|---|---|
| EP | 2 129 018 A1 | 12/2009 |
| EP | 2 190 139 A1 | 5/2010 |
| JP | 5-102943 A | 4/1993 |
| JP | 2001-238269 A | 8/2001 |
| JP | 2002-516519 A | 6/2002 |
| JP | 2003-179573 A | 6/2003 |
| JP | 2003-304218 A | 10/2003 |
| JP | 2006-166436 A | 6/2006 |
| JP | 2006-313993 A | 11/2006 |
| JP | 2007-151059 A | 6/2007 |
| WO | WO 99/60739 A1 | 11/1999 |
| WO | WO 2004/075444 A2 | 9/2004 |
| WO | WO-2006/114932 A1 | 11/2006 |
| WO | WO 2006/130742 A1 | 12/2006 |
| WO | WO 2007/029406 A1 | 3/2007 |
| WO | WO 2007/091815 A2 | 8/2007 |
| WO | WO-2008/081876 A1 | 7/2008 |

OTHER PUBLICATIONS

NTT DoCoMo et al., DFT-Spread OFDM with Pulse Shaping Filter in Frequency Domain in Evolved UTRA Uplink, 3GPP TSG RAN WG1 #42 on LTE, R1-050702, Sep. 2005, pp. 1-8.

Kojima et al., "Tachi Hencho CI/OFDM Hoshiki no PAPR Tokusei", 2005 Nen IEICE Communications Society conference Koen Ronbunshu 1, Sep. 7, 2005, p. 476, B-5-76.

Atarashi et al., "Variable Spreading Factor-Orthogonal Frequency and Code Division Multiplexing (VSF-OFCDM) for Broadband Packet Wireless Access", IEICE Trans. Commun., vol. E86-B, No. 1 Jan. 2003, pp. 291-299.

Atarashi, H. et al., "Variable Spreading Factor and Symbol Repetition Factor multicarrier DS-CDMA for Broadband Wireless Access in Reverse Link", Proceedings of the IEICE General Conference, Mar. 3, 2003, B-5-53.

European Search Report issued in European Patent Application No. 08831182.4 on Dec. 20, 2011.

Maeda, N. et al., "Variable Spreading Factor-OFCDM with Two Dimensional Spreading that Prioritizes Time Domain Spreading for Forward Link Broadband Wireless Access", VTC 2003, Spring, the 57th IEEE Semiannual vehicular Technology Conference Proceedings, Jeju, Korea, Apr. 22-25, 2003; New York, NY, IEEE, US, vol. 1, Apr. 22, 2003, pp. 127-132, XP010862113.

Sawahashi, M. et al., "Variable Spreading Factor Orthogonal Frequency and Code Division Multiplexing (OFCDM) for Broadband Packet Transmission", Proceedings of the IEICE Engineering Sciences Society, Aug. 29, 2001, pp. 312-313, PA-4-1.

Takyu, O. et al., "Orthogonal Variable-Spreading Factor Code Selection for Peak Power Reduction in Multi-rate OFCDM Systems", VTC 2003, Spring, The 57th IEEE Semiannual Vehicular Technology Conference Proceedings, Jeju, Korea, Apr. 22-25, 2003, New York, NY IEEE, US, vol. 1, Apr. 22, 2003, pp. 117-121, XP010862079.

Takyu, O. et al., "Orthogonal Variable Spreading Factor Code Selection for Peak Power Reduction in Multi-Rate OFCDM Systems", IEICE Technical Report, Jan. 10, 2003, vol. 102, No. 548, p. 79-84, RCS2002-266.

J. Zhang et al., "Comparison of the Link Level Performance between OFDMA and SC-FDMA", Communications and Networking in China, Oct. 27, 2006.

Motorola, "Additional details on DCFB for obtaining MIMO channel information at Node B", 3GPP TSG RAN WG1 #42, Seoul, Korea, Nov. 7-Nov. 11, 2005, R1-051516.

LG Electronics, PAPR Comparison of uplink MA Schemes, 3GPP TSG RAN WG1 Meeting #41 R1-050475, May 13, 2005.

LG Electronics, Text proposal on localized and distributed SC-FDMA [on line], 3GPP TSG-RAN WG#45 R1-061161, <URL: http:/www.3gpp.org/ftp/tsg_ran/WG1_RL1/TSGR1_45/Docs/R1-061161.zip>, May 12, 2006.

NTT DoCoMo et al., Investigations on Adaptive Control of Roll-off Factor for DFT-Spread OFDM Based SC-FDMA in E-UTRA Uplink, 3GPP TSG RAN WG1 Meeting #46bis R1-062713, Oct. 13, 2006.

Samsung, LFDMA and DFDMA Multiplexing in Evolved UTRA Uplink and Text Proposal [online], 3GPP TSG-RAN WG1#44 R1-060349, <URL: http//www.3gpp.org/ftp/tsg_ran/WG1_RL1/TSGR1_44/Docs/R1-060349.zip> Feb. 17, 2006.

European Search Report issued in European Patent Application No. 12001406.3 on Jun. 4, 2012.

U.S. Office Action issued in U.S. Appl. No. 13/457,298 on Jul. 17, 2013.

U.S. Office Action issued in U.S. Appl. No. 13/457,298 on Mar. 14, 2013.

U.S. Notice of Allowance issued in U.S. Appl. No. 13/457,298 on Oct. 7, 2013.

\* cited by examiner

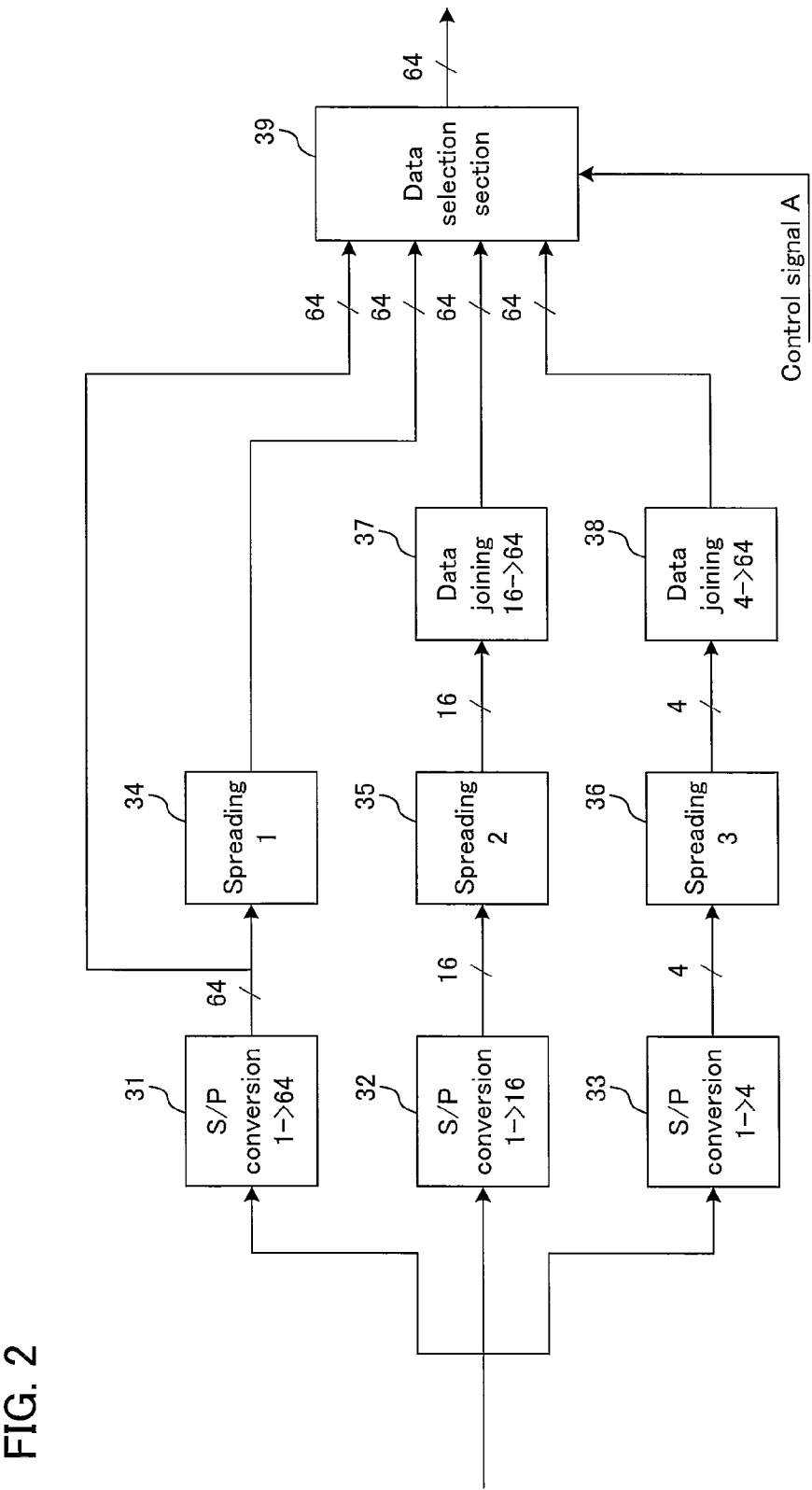

US 8,681,688 B2

RADIO COMMUNICATION METHOD, RADIO COMMUNICATION SYSTEM, AND RADIO TRANSMISSION APPARATUS

TECHNICAL FIELD

The present invention relates to a radio communication method and a radio transmission apparatus, and more particularly, to a radio communication method, a radio communication system, and a radio transmission apparatus for use in Orthogonal Frequency Division Multiplexing (OFDM) and Code Division Multiplexing (CDM) communication in which data communication is performed with a combination of multi-carrier signals typified by CDM-OFDM which transmits spread data using orthogonal codes.

BACKGROUND ART

In recent years, next-generation mobile communication systems have been actively studied and a one-frequency repeating cellular system in which individual cells use the same frequency band has been proposed as a scheme for improving efficiency of frequency utilization in such systems.

For downlink (i.e., communication from a base station apparatus to a mobile station), Orthogonal Frequency Division Multiple Access (OFDMA) is the most promising candidate. OFDMA is a system that performs communication by allocating slots, which are units of access consisting of time axis and frequency axis, among multiple mobile terminal apparatuses and using OFDM signals which are produced by modulating information data such as by 64-ary Quadrature Amplitude Modulation (64 QAM) or Binary Phase Shift Keying (BPSK). Because it uses OFDM signals, Peak to Average Power Ratio or PAPR can become very high. High peak power is not a very large problem in downlink communication which has a relatively large margin in transmission power amplification capability, but can be a significant issue in uplink (i.e., communication from a mobile station to the base station apparatus) which has no margin in transmission power amplification capability.

Also, to reduce effect of interference occurring in one-cell repetition, a CDM-OFDM scheme has been studied that distributes one piece of data across multiple carriers (this process is called "spreading") and sends multiple pieces of data multiplexed (i.e., spreads data using orthogonal codes for multiplexing). It is said that in generation of CDM-OFDM signals, use of orthogonal codes enables data to be demultiplexed, ideally on a receiver, and use of scrambling codes specific to the base station can spread interference as well.

Non-Patent Document 1 listed below discloses CDM-OFDM (referred to as "OFCDM" in the document). According to the document, in an isolated cell, better throughput characteristics are obtained when spreading in frequency domain is not used because such a cell is little affected by interference, whereas in an environment largely affected by interference, e.g., in a one-frequency repeating system, spreading in frequency domain results in better characteristics.

Meanwhile, Patent Document 1 shown below proposes a scheme for switching an access method. The scheme shown in the document switches between multi-carrier and single-carrier. The scheme is basically intended for use in uplink and proposes that single-carrier scheme be selected when high transmission power is required and the OFDM scheme when low transmission power is required.

Non-Patent Document 1: IEICE TRANS. COMMUN., VOL. E86-B, NO. 1 January 2003 "Variable spreading-factor-Orthogonal Frequency and Code Division Multiplexing (VSF-OFCDM) for Broadband Packet Wireless Access"

Patent Document 1: JP Patent Publication (Kokai) No. 2007-151059 A

DISCLOSURE OF THE INVENTION

Problems to be Solved by the Invention

Non-Patent Document 1 proposes a scheme to change spreading factor in a CDM-OFDM system in consideration of communication environment. However, because the scheme does not take into account PAPR characteristics of signals, it still leaves a problem in expansion of coverage area.

Patent Document 1 describes that effect of PAPR characteristics is reduced by switching the access method between single-carrier and multi-carrier, but the technique has the problem of wide variations in communication characteristics because it uses switching between two methods.

In single-carrier communication, as a communication band becomes wider, characteristics degrade due to effect of frequency selectivity fading. Accordingly, in a communication system using a wide frequency band, degradation in characteristic is significant and throughput decreases. In other words, in downlink communication in a cellular system, coverage area could be expanded in terms of PAPR characteristics but characteristic degradation would affect a wide area.

The present invention has been made in view of such problems, and an object thereof is to provide a technique for expanding coverage area in the CDM-OFDM scheme in consideration of PAPR characteristics and with minimized degradation in characteristics.

Means for Solving the Problems

According to an aspect of the present invention, there is provided a transmission apparatus for use in CDM-OFDM transmission in which data is transmitted with a combination of a CDM scheme and an OFDM scheme, the transmission apparatus comprising: a variable-gain amplifier for adjusting transmission power: a variable-spreading-factor spreading section for spreading transmission data across a plurality of sub-carriers in accordance with a spreading factor using a rotation orthogonal code; and a control section for controlling an amplification factor of the variable-gain amplifier and the spreading factor of the variable-spreading-factor spreading section. Preferably, the control section performs control to increase the spreading factor as the amplification factor is increased. To increase the spreading factor means to use more sub-carriers for transmitting one piece of data. The spreading factor is defined as SF herein. For a terminal that requires high transmission power, communication can be performed without distortion of signals by using a rotation orthogonal code and transmitting data with a large SF.

Furthermore, there is provided a transmission apparatus for use in CDM-OFDMA transmission in which data is transmitted with a combination of a CDM scheme and an OFDMA scheme which is composed of a plurality of time/frequency sub-channels, the transmission apparatus comprising: a variable-gain amplifier for adjusting transmission power: a variable-spreading-factor spreading section for spreading transmission data across a plurality of sub-carriers in accordance with a spreading factor using a rotation orthogonal code, for each frequency sub-channel; and a control section for controlling an amplification factor of the variable-gain amplifier and the spreading factor of the variable-spreading-factor spreading section. Preferably, the control section performs control to increase the spreading factor as the amplification factor is increased. Also, the control section preferably performs control so that the same spreading factor is used on frequency sub-channels that are on the same time sub-channel which is formed by dividing time into a plurality of time channels. However, it is not strictly required that the spreading factor be the same, and spreading factors may be controlled in the direction that brings them closer to the same one.

Furthermore, the transmission apparatus preferably comprises a data inserting section for inserting zero data for unused sub-carriers in accordance with a number by which sub-carriers used are decreased; and a sub-carrier allocation section for selecting sub-carriers used for communication of spread data and allocating the data to the sub-carriers. By decreasing sub-carriers that are used and selecting sub-carriers with low interference, effect of interference can be reduced. Also, the position of sub-carriers used may be changed.

The sub-carrier allocation section preferably allocates sub-carriers for each one of groups that are formed by dividing spread data. The sub-carrier allocation section preferably determines sub-carriers for use in accordance with quality of individual sub-carriers. By selecting and allocating sub-carriers of good quality to each group, sub-carriers of good quality are more likely to be selected and correlation of interference from other cells can be lowered.

The variable-spreading-factor spreading section preferably comprises discrete Fourier transform processing and realizes spreading with a variable spreading-factor by selecting output of one of discrete Fourier transform processing stages in accordance with the spreading factor.

There is also provided a transmission apparatus for use in data CDM-OFDM transmission in which data is transmitted with a combination of a CDM scheme and an OFDM scheme, the transmission apparatus comprising: a variable-spreading-factor spreading section for spreading data in frequency domain using a rotation orthogonal code; and an RF section for changing output power in accordance with the spreading factor. Preferably, the variable-spreading-factor spreading section comprises discrete Fourier transform processing and realizes spreading with a variable spreading-factor by selecting output of one of discrete Fourier transform processing stages in accordance with the spreading factor.

According to another aspect of the invention, there is provided a radio communication system composed of a base station and a plurality of terminal apparatuses that are connected to the base station, wherein a transmission method by the transmission apparatus according to any one of the above-described aspects is used for communication from the base station to the terminal apparatuses, and DFT-s-OFDM communication is used for communication from the terminal apparatuses to the base station. Preferably, a first terminal apparatus among the plurality of terminal apparatuses has a function of transmitting and receiving data to and from the base station and a second terminal apparatus that is different from the first terminal apparatus. Preferably, a terminal apparatus among the plurality of terminal apparatuses that is connected to the base station has a function of receiving data transmitted from the base station using a rotation orthogonal code and transmitting the received data to another terminal apparatus using the DFT-s-OFDM communication scheme.

According to another aspect of the invention, there is provided a CDM-OFDM transmission method for transmitting data with a combination of a CDM scheme and an OFDM scheme, the method comprising a step of using a rotation orthogonal code as a spreading code for use in frequency spreading in the CDM scheme and changing a spreading factor in accordance with transmission power.

There is also provided a CDM-OFDMA transmission method for transmitting data with a combination of a CDM scheme and an OFDMA scheme which is composed of a plurality of time/frequency sub-channels, the method comprising a step of using a rotation orthogonal code as a spreading code for use in frequency spreading in the CDM scheme and changing a spreading factor for each frequency sub-channel in accordance with transmission power.

In the transmission methods, a method that is implemented by any of the configurations specified for the transmission apparatuses above can be used.

Further, there may be also provided a CDM-OFDMA transmission method for transmitting data with a combination of a CDM scheme and an OFDMA scheme which is composed of a plurality of time/frequency sub-channels, the method comprising: a step of using a rotation orthogonal code as a spreading code for use in frequency spreading in the CDM scheme and setting a spreading factor in accordance with transmission power for each frequency sub-channel; and a step of changing the number of sub-carriers used, or a CDM-OFDM transmission method for transmitting data with a combination of a CDM scheme and an OFDM scheme, the method comprising: an amplification step of adjusting transmission power; and a variable-spreading-factor spreading step of spreading transmission data across a plurality of sub-carriers in accordance with a spreading factor using a rotation orthogonal code, wherein an amplification factor used in the amplification step and the spreading factor used in the variable-spreading-factor spreading step are controlled, or a CDM-OFDMA transmission method for transmitting data with a combination of a CDM scheme and an OFDMA scheme which is composed of a plurality of time/frequency sub-channels, the method comprising: an amplification step of adjusting transmission power; an a variable-spreading-factor spreading step of spreading transmission data across a plurality of sub-carriers in accordance with a spreading factor using a rotation orthogonal code for each frequency sub-channel, wherein an amplification factor used in the amplification step and the spreading factor used in the variable-spreading-factor spreading step are controlled.

A program for causing a microcomputer such as a computer to execute the functions of the transmission methods and/or transmission apparatuses is also encompassed within the scope of the invention, or a recording medium having a microcomputer-readable program for executing that program stored thereon is also contemplated.

Advantages of the Invention

For a terminal that requires high transmission power, communication can be performed without distortion of signals by using rotation orthogonal codes and transmitting data with a high SF. By changing SF in accordance with required transmission power, more flexible communication can be realized while minimizing degradation in characteristics that results from communication being performed in a wide frequency band.

BRIEF DESCRIPTION OF THE DRAWINGS

FIG. 2 is an exemplary functional block diagram showing details of variable-SF spreading section 3 of FIG. 1B.

DESCRIPTION OF SYMBOLS

1 . . . encoding section, 2 . . . modulation section, 3 . . . variable-SF spreading section, 4 . . . IDFT section, 5 . . . guard interval (GI) inserting section, 6 . . . parallel/serial (P/S) conversion section, 7 . . . digital/analog (D/A) conversion section, 8 . . . RF section, 10 . . . control section, 85 . . . variable-gain amplifier, 86 . . . high output amplifier.

BEST MODE FOR CARRYING OUT THE INVENTION

A communication technique according to embodiments of the invention will be described below by taking MC-CDM (Multi-Carrier CDM) as an example of a Code Division Multiplexing (CDM) multi-carrier communication scheme with a variable spreading-factor (hereinafter spreading factor will be referred to as "SF"). As OFDM (Orthogonal Frequency Division Multiplexing) is used as an example of the multi-carrier scheme, it may sometimes be referred to as CDM-OFDM herein. Descriptions herein assume that there are 64 sub-carriers for OFDM signals in total, and SF of 1 (i.e., normal OFDM), 4, 16, and 64 can be used. SF indicates how many sub-carriers are used for sending one piece of data. Also, the embodiments described below show cases where the same number of pieces of data as SF are multiplexed (i.e., the same number of orthogonal codes as SF are used) unless otherwise specified. Further, the embodiments envisage downlink communication, which generally refers to communication from a base station to a mobile station, unless otherwise specified.

A communication technique according to a first embodiment of the invention will be now described with reference to drawings. The first embodiment of the invention is premised on services in a local area. For services in a local area, effect of interference is not a significant consideration. The Non-Patent Document 1 shown above also describes that effect of interference is little in such an area and use of OFDM signals with SF set to 1, that is, normal OFDM signals, is the way to obtain the highest throughput. As a factor that allows SF to be set to one, it is premised that linearity of a high-output amplifier of the base station can be kept high and that OFDM signals with high PAPR (Peak to Average Power Ratio) can be transmitted without distortion. Distortion of signals caused by an amplifier will be described with reference to FIG. 1A.

Figure 1A:
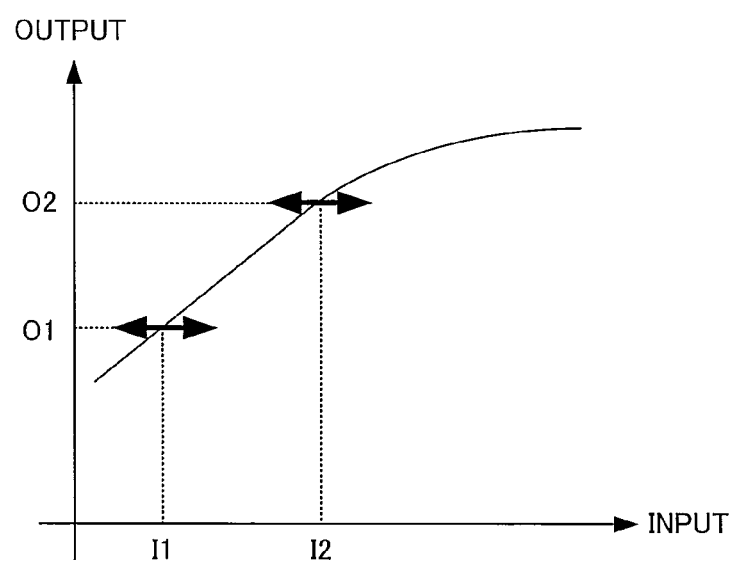
FIG. 1A shows an example of input/output power characteristics of a high-output amplifier.

FIG. 1A shows an example of input/output power characteristics of a high-output amplifier. In the figure, the horizontal axis represents input power and the vertical axis represents output power, and the bold arrows show variations in instantaneous input power of a signal. An amplifier has high linearity when average input power to the amplifier is set to I1 in FIG. 1A (hereinafter such a region will be called a "linear region"), for example. In other words, a constant gain is obtained with any instantaneous input power of an input signal. On the other hand, when the average input power to the amplifier is set to I2, a constant gain cannot be obtained with respect to variations in instantaneous input power (i.e., gain is less when instantaneous input power is high than when it is low). This leads to problems like signal distortion or leakage of signals outside a band (hereinafter, such a region will be called a "non-linear region").

Conventional discussions on communication have assumed that signals are not distorted, that is to say, processing is linear, on a base station as shown in the Non-Patent Document 1. However, for expansion of coverage area per base station, it is required to further increase transmission power, and due to limitation on improvement of amplifier performance, operation in the non-linear region has to be considered. To enable operation in the non-linear region, it is important to limit signal PAPR, i.e., the variation shown by the bold arrows in FIG. 1A, to a small range. A normal OFDM signal scheme uses a signal with this bold-arrow range being wide, known to be a scheme that does not lend itself to non-linear operation of an amplifier.

Figure 1B:
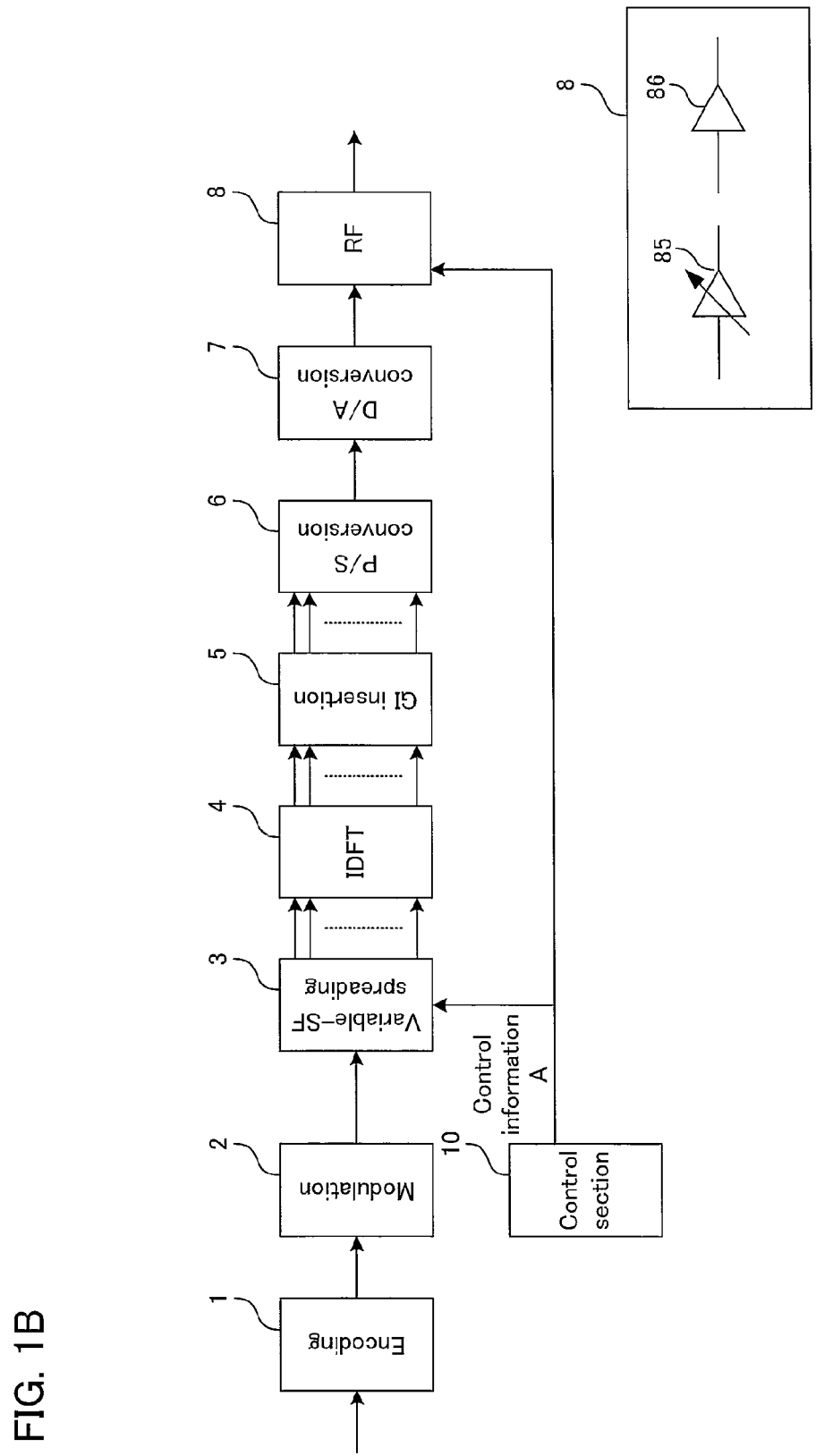
FIG. 1B is a functional block diagram showing an example of a transmission apparatus for use with a communication technique according to an embodiment of the present invention.

FIG. 1B is a functional block diagram showing an example of a transmission apparatus for use with the communication technique according to an embodiment of the invention. In the figure, reference numeral 1 denotes an encoding section for encoding data, and 2 denotes a modulation section for performing modulation, such as BPSK (modulation performed in this section may be sometimes called "primary modulation"). Reference numeral 3 denotes a variable-SF spreading section for performing spreading with a variable SF based on control information A from a control section 10. The variable-SF spreading section will be described in more detail later. Reference numeral 4 denotes an IDFT section for performing Inverse Discrete Fourier Transform (IDFT) on output from the spreading section. Needless to say, in general, Inverse Fast Fourier Transform (IFFT) is often used. Reference numeral 5 denotes a Guard Interval (GI) inserting section. GI is used in OFDM signals in most existing systems for reducing effect of inter-symbol interference. Reference numeral 6 denotes a parallel/serial (P/S) conversion section for converting output from the GI inserting section 5 into a serial data sequence. Reference numeral 7 denotes a digital/analog (D/A) conversion section for converting digital data into analog data. Reference numeral 8 denotes an RF section for transmitting a signal from an antenna after converting the signal to a frequency band for analog signal transmission and controlling the signal to an appropriate transmission power. The RF section 8 includes a variable-gain amplifier 85 for adjusting output power and a high-output amplifier 86, which was mentioned above. Finally, reference numeral 10 denotes a control section, configured to generate control information A for determining variable SF and input the control information A to the variable-SF spreading section 3 and the RF section 8. In control information A, SF is changed depending on transmission power required.

FIG. 2 is an exemplary functional block diagram showing details of the variable-SF spreading section 3 of FIG. 1B. In the figure, reference numerals 31 to 33 denote first to third serial/parallel conversion sections (S/P conversion sections) for converting input data from serial to parallel; reference numerals 34 to 36 denote first to third spreading sections for spreading data; reference numerals 37 and 38 denote data joining sections for joining pieces of data together; and reference numeral 39 denotes a data selection section for selecting SF according to control signal A. The first, second, and third S/P conversion sections 31, 32, and 33 have different rates, outputting 64, 16, and 4 pieces of parallel data, respectively. In the first to third spreading sections 34 to 36, spreading takes place in accordance with their respective SFs. Operations of the first to third data spreading sections 34 to 36 will be described later taking the spreading section 34 as an example.

As 64 sub-carriers is assumed herein, the data joining sections 37 and 38 connect multiple outputs from the second and third spreading sections 35 and 36 to produce data for 64 sub-carriers. As an output of the second spreading sections 35 is 16 pieces of data, the data joining section 37 joins four outputs to generate data equivalent to 64 sub-carriers, and as an output of the third spreading section 36 is 4 pieces of data, the data joining section 38 connects 16 outputs to generate data equivalent to 64 sub-carriers. Output of the S/P conversion section 31 may sometimes be input to the data selection section 39 as it is. This is the case when an OFDM signal with SF of 1, i.e., a normal OFDM signal, is generated. The data selection section 39 selects and outputs data for use in accordance with control signal A. In FIG. 2, numbers (4, 16, and 64) indicated on arrows showing signal flow represent the number of pieces of data that are input or output at a time.

Figure 3:
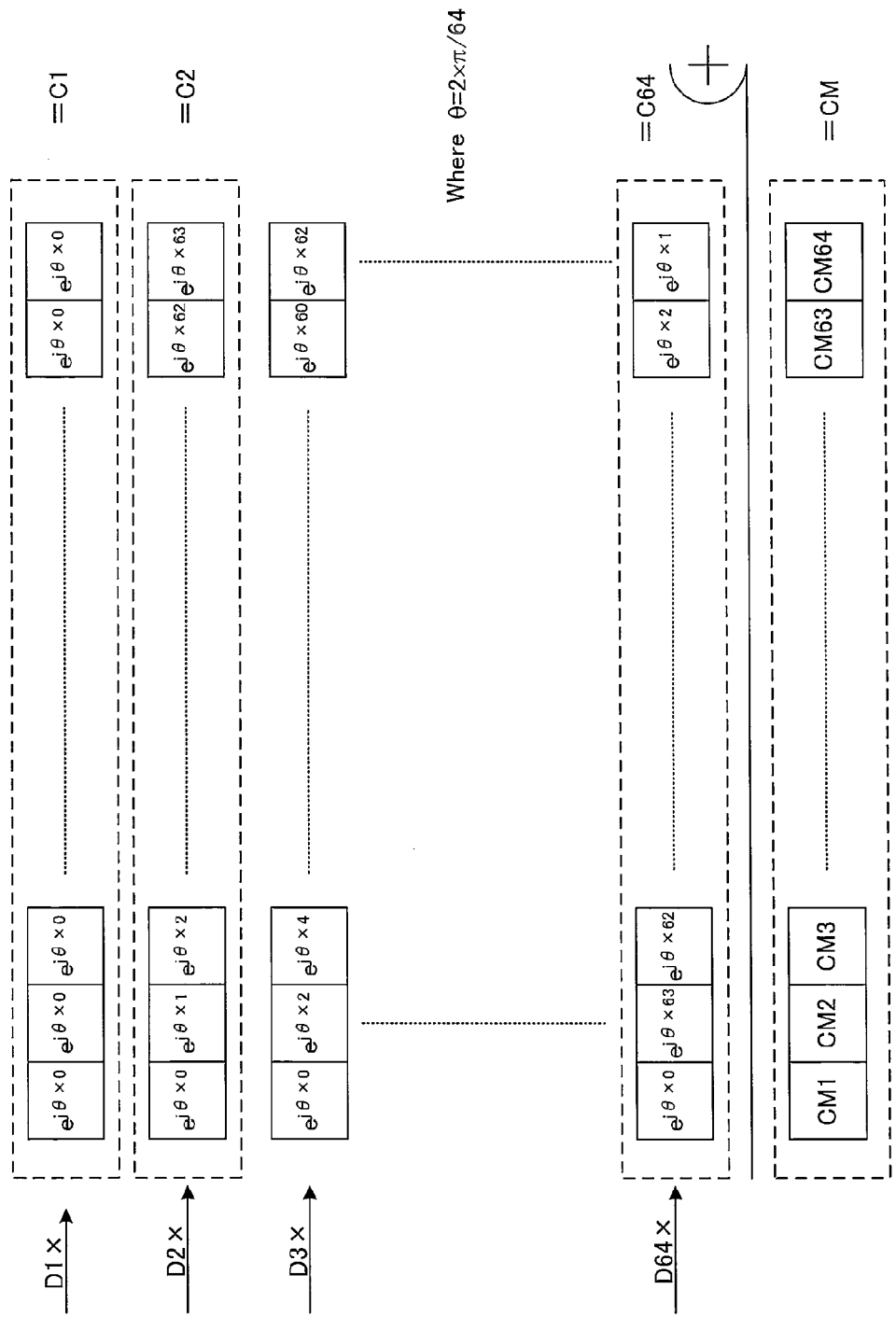
FIG. 3 is a schematic diagram showing exemplary operations of the spreading section shown in FIG. 2.

FIG. 3 is a schematic diagram illustrating exemplary operations of a spreading section shown in FIG. 2. Input data Dk is complex data from D1 through D64, represented by Dk=ak+bkj (k is data number). Here, ak and bk are values that depend on the primary modulation scheme; for example, when the primary modulation scheme is BPSK, ak=±1 and bk=0. Also, j×j=−1.

The present embodiment employs rotation orthogonal codes as codes for CDM. A rotation orthogonal code Cm of a code length of L (m is a subscript indicative of code type, being a natural number from 1 to L) can be represented as: Cm=($e^{j\times\theta\times(m-1)\times 0}$, $e^{j\times\theta\times(m-1)\times 1}$, ..., $e^{j\times\theta\times(m-1)\times(L-1)}$), where $\theta=2\times\pi/L$.

FIG. 3 shows rotation orthogonal codes for L=64. Input Dk is multiplied by individual elements constituting Cm. For the sake of simplicity, however, pairs that make k=m are used as pairs for multiplication. Thereby, Dk is split into 64 pieces of data. The 64 results are added for each element to produce output of the spreading section. When this output signal is denoted as CM, Cm=($\Sigma$m (am+bmj)×$e^{j\times\theta\times(m-1)\times 0}$, $\Sigma$m(am+bmj)×$e_{j\times\theta\times(m-1)\times 1}$, ..., $\Sigma$m (am+bmj)×$e^{j\times\theta\times(m-1)\times(L-1)}$), where $\Sigma$m is addition regarding m.

While FIG. 3 shows an example of 64-spreading, the spreading sections 35 and 36 of FIG. 2 perform spreading with L=16 and L=4, respectively. The variable-SF spreading section then selects a signal corresponding to the SF specified in the control signal A.

Figure 4:
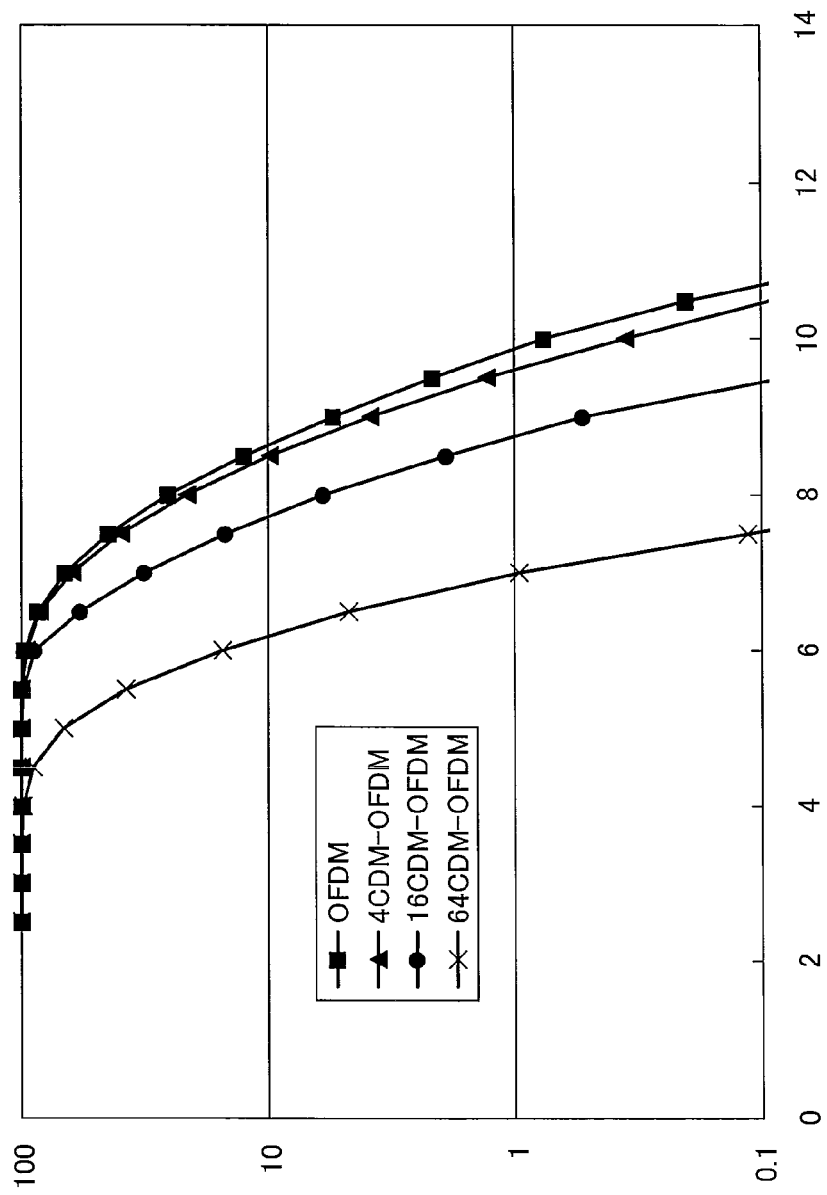
FIG. 4 shows PAPR characteristics for various SFs with a total of 64 sub-carriers.

To demonstrate the advantage of using rotation orthogonal signals for spreading, FIG. 4 shows PAPR characteristics for various SFs when a total of 64 sub-carriers are used. In the figure, the horizontal axis represents PAPR (dB) and the vertical axis represents the probability (%) that a signal has a PAPR exceeding the PAPR indicated on the horizontal axis. However, this data represents values calculated through simulation of patterns of some signals. Also, numbers preceding CDM-OFDM indicate SF, and characteristics denoted by square plot points in the figure represent PAPR characteristics with SF=1 (i.e., normal OFDM), triangle points with SF=4, circle points with SF=16, and "x" points with SF=64.

As can be seen from the plot of FIG. 4, PAPR characteristics are improved as SF increases. By way of example, if input power to the high-output amplifier is set with PAPR characteristics of 1% (i.e., at "1" on the vertical axis of the plot) as a reference, a margin of about 0.3 dB, 1.3 dB, and 3 dB are produced for SF of 4, 16, and 64, respectively, relative to the normal OFDM signal. In other words, when the same high-output amplifier is used, the average input power can be increased by 0.3 dB, 1.3 dB, and 3 dB for SF of 4, 16, and 64, respectively, and output power can accordingly be increased as well.

Describing this more specifically, when "Iin" denotes the limit of average input power to the high-output amplifier during transmission of normal OFDM signals (a level of electric power, input of an average input power exceeding which makes effect of non-linear distortion non-negligible), the limit of average input power can be increased up to (Iin+0.3) dB for SF4, (Iin+1.3) dB for SF16, and (Iin+3) dB for SF64.

As described above, when considering communication in a local area and expansion of coverage area, for a terminal that requires high transmission power, communication can be performed without distortion of signals by using rotation orthogonal codes and transmitting data with a high SF. In addition, since PAPR characteristics are dependent on SF, by changing SF in accordance with required transmission power, more flexible communication can be realized while minimizing degradation in characteristics that result from communication being performed in a wide frequency band.

Figure 5:
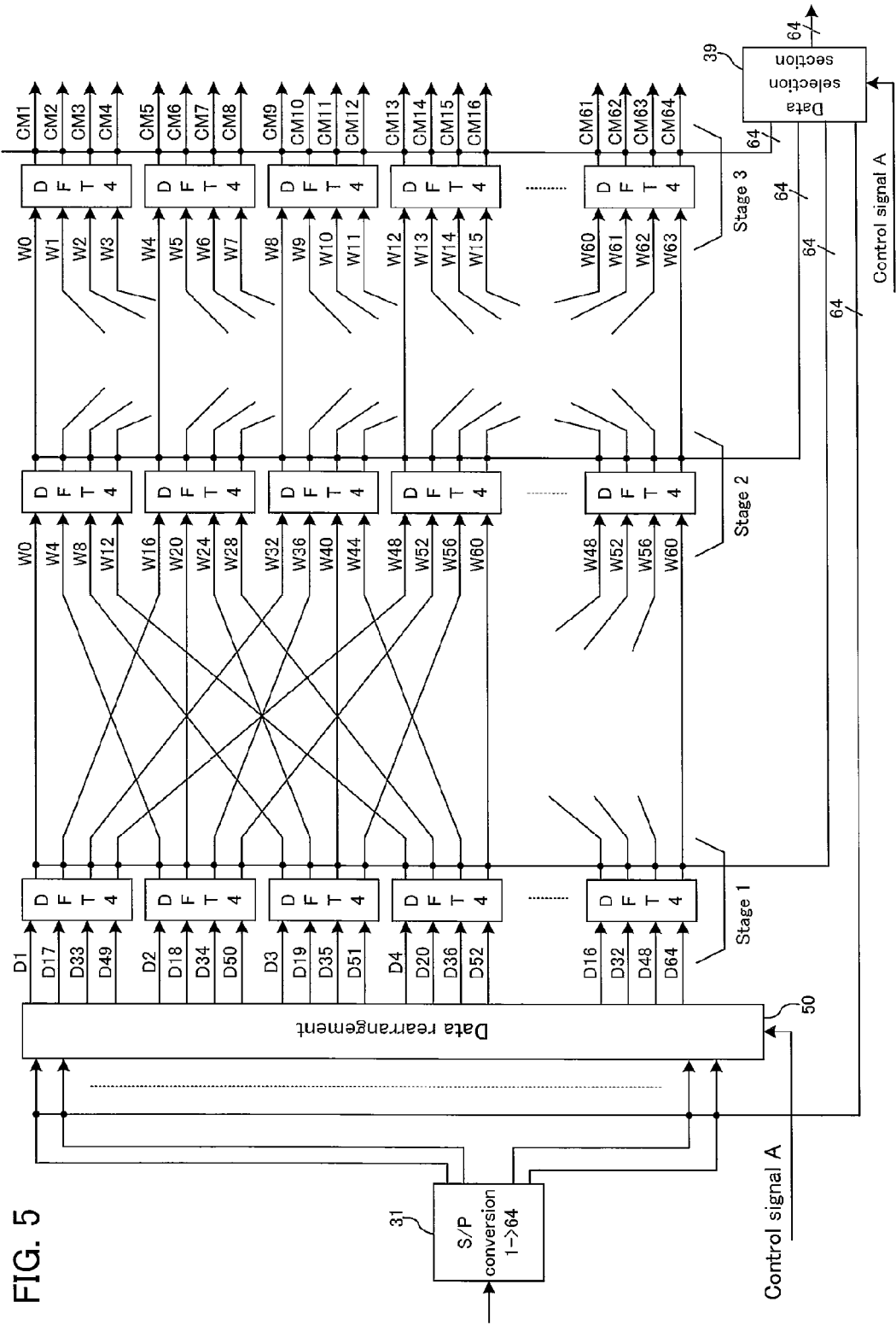
FIG. 5 shows an exemplary configuration of the variable-SF spreading section with a reduced circuit scale.

FIG. 5 shows an exemplary configuration of the variable-SF spreading section of a reduced circuit scale. This configuration implements spreading by DFT and can be realized with several butterfly operation units and memory. DFT permits high-speed computation and also can simplify circuitry as compared to the configuration shown above. While FIG. 5 shows time thinning method, this configuration can be also realized by frequency thinning method.

FIG. 5 shows butterfly operation units with a radix of 4. Although the figure shows that 16×3 (stages)=48 butterfly operation units (denoted as DFT4s) are necessary for the sake of simplifying the following description, as these butterfly operation units have exactly the same structure, this configuration could be realized with at least one butterfly operation unit. DFT processing has a notion of processing stages corresponding to radix, and 64 (the number of DFT points) is represented as 4 (i.e., radix)$^3$. Thus, there are three stages of processing in this embodiment.

When its inputs are denoted as X1, X2, X3, X4 and outputs are as Y1, Y2, Y3, Y4, radix-4 butterfly operation is represented by Equation (1):

[Equation 1]

$$Y1 = X1 + X2 + X3 + X4$$

$$Y2 = X1 - jX2 - X3 + jX4$$

$$Y3 = X1 - X2 + X3 - X4$$

$$Y4 = X1 + jX2 - X3 - jX4 \quad (1)$$

Here, j represents a complex number. The DFT4s in FIG. 5 are all operations represented by Equation (1). Also, on arrows indicative of data flow between DFT4s, signals are shown as "Wa". This "Wa" is a numerical value called a twiddle factor to be multiplied to data flowing on each arrow. As the number of DFT points is 64 in the present embodiment, the twiddle factor is defined by Equation (2):

[Equation 2]

$$Wa = e^{j \times 2\pi \times a/64} \quad (2)$$

The variable-SF spreading section shown in FIG. 5 includes the S/P conversion section 31, a data rearrangement section 50, the data selection section 39, and the butterfly operation sections (the DFT4s). In the figure, blocks having the same function as those in the functional block diagram of FIG. 2 are given the same reference numerals.

Data input to the variable-SF spreading section of FIG. 5 is subjected to S/P conversion. FIG. 5 shows a case where 64 pieces of parallel data, which is equal to the number of the maximum sub-carriers, are generated. The S/P output is input to the data selection section 64, and selection of this output means selection of SF=1, namely the OFDM scheme.

Then, the pieces of parallel-converted data are rearranged. Here, the data are rearranged in accordance with SF specified in control signal A. FIG. 5 shows the result of rearrangement with a SF of 64 selected. When SF is 16, rearranged outputs will be: D1, D5, D9, D13, D2, D6 . . . , and when SF is 4, rearranged outputs will be: D1, D2, D3, D4, D5, D6 . . . .

When input in the sequences shown here, data are put in a neat order. When SF is 16, D1 through D16 undergo spreading in the first 16 sub-carriers, and D17 through D32 in the next 16 sub-carriers, and data are subsequently spread in order of their subscripts. This is similar when SF is 4. When this order of data is not necessary, rearrangement is not necessarily required if data order is known between the transmitter and the receiver.

When SF is 64, processing at all of the stages is performed and output of stage 3 is selected in the data selection section 64. When SF of 16 is selected, the data selection section 64 selects output of stage 2. When SF is 4, the data selection section 64 selects output of stage 1.

Thus, by selecting output of one of stages in one run of DFT, it is possible to generate a CDM signal with variable SF using rotation orthogonal codes.

Figure 6:
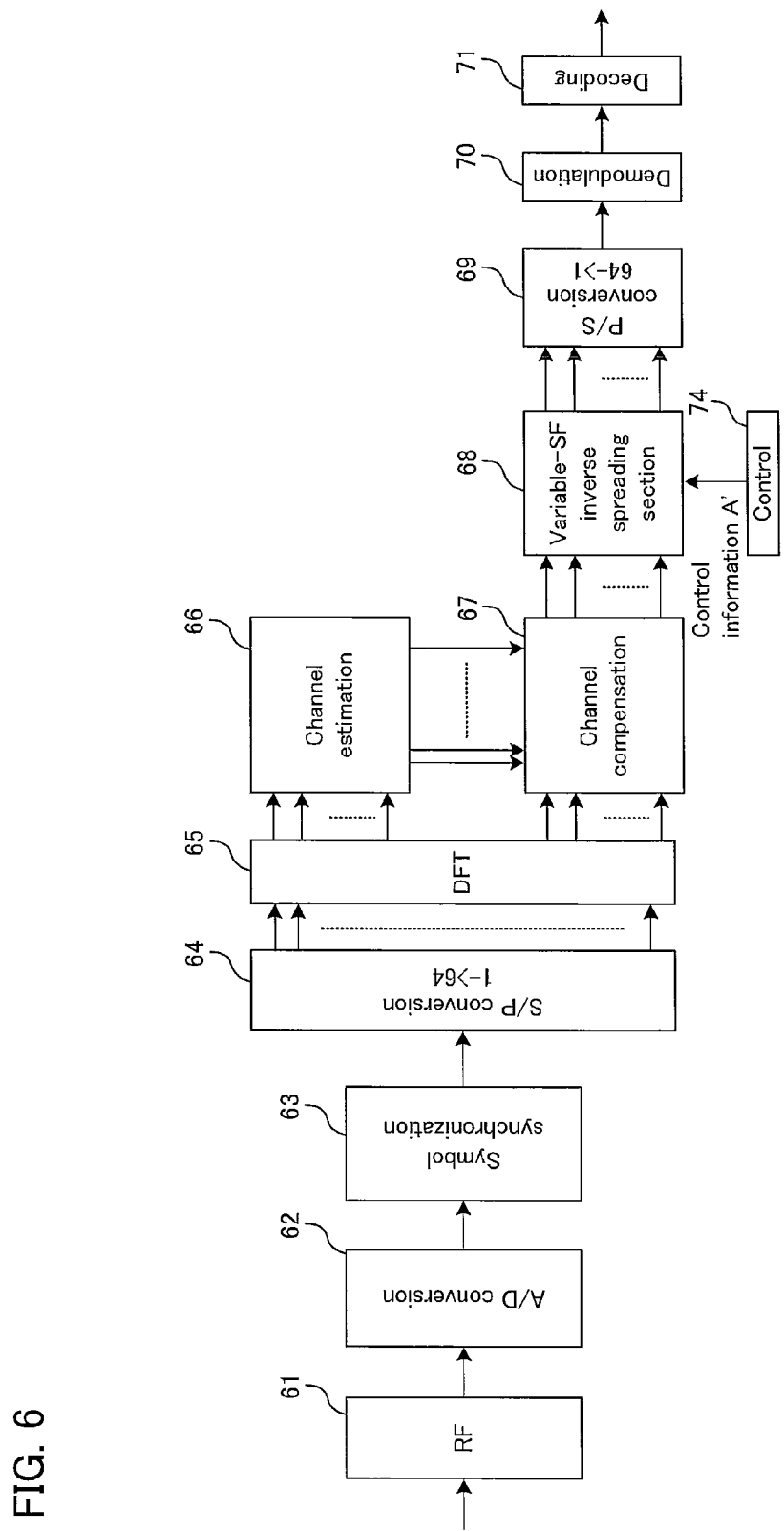
FIG. 6 shows an exemplary block configuration of a receiver.

Now, an exemplary configuration of a receiver is shown. Note that the configuration shown here employs IDFT corresponding to DFT of FIG. 5 as variable-SF inverse spread processing. FIG. 6 shows an exemplary block configuration of a receiver. In the figure, reference numeral 61 denotes an RF section that has the capability of converting a received signal to a frequency band in which the signal can be converted into a digital signal; 62 denotes an A/D conversion section for converting an analog signal to a digital signal; 63 denotes a symbol synchronization section for achieving symbol synchronization for an OFDM signal and removing GI which is added on the sending side; 64 denotes a S/P conversion section for performing serial to parallel conversion in order to conform a symbol-synchronized signal to the number of DFT input points (converts to 64 points in the present embodiment); and 65 denotes a DFT section for performing DFT processing. Needless to say, in general, FFT (Fast Fourier Transform) is often used. Of signals resulting from DFT, one for use in channel estimation is input to a channel estimation section 66, in which a channel estimation process is performed. A signal for data is input to a channel compensation section 67, in which channel compensation is conducted on the signal with respect to the channel estimation signal. Here, processing that is less prone to noise enhancement is preferably performed.

After undergoing channel compensation, the signal is input to the variable-SF inverse spreading section 68 and subjected to a variable-SF inverse spreading process therein. To the variable-SF inverse spreading section 68, control information A' regarding SF is input from the control section 74, and a variable-SF inverse spreading process is performed on the basis of SF. The inverse spreading process will be described in more detail later. After variable SF inverse spreading, the signal is converted to serial data in the parallel/serial conversion section 69. Then, in a demodulation section 70, the signal undergoes demodulation corresponding to the primary modulation applied in the transmission apparatus to be input to a decoding section 71. The decoding section 71 performs processing corresponding to encoding applied in the transmission apparatus to obtain transmitted data. It is also assumed that the control section 74 has the capability of supplying SF information and SF is already known at the time of data demodulation.

Figure 7:
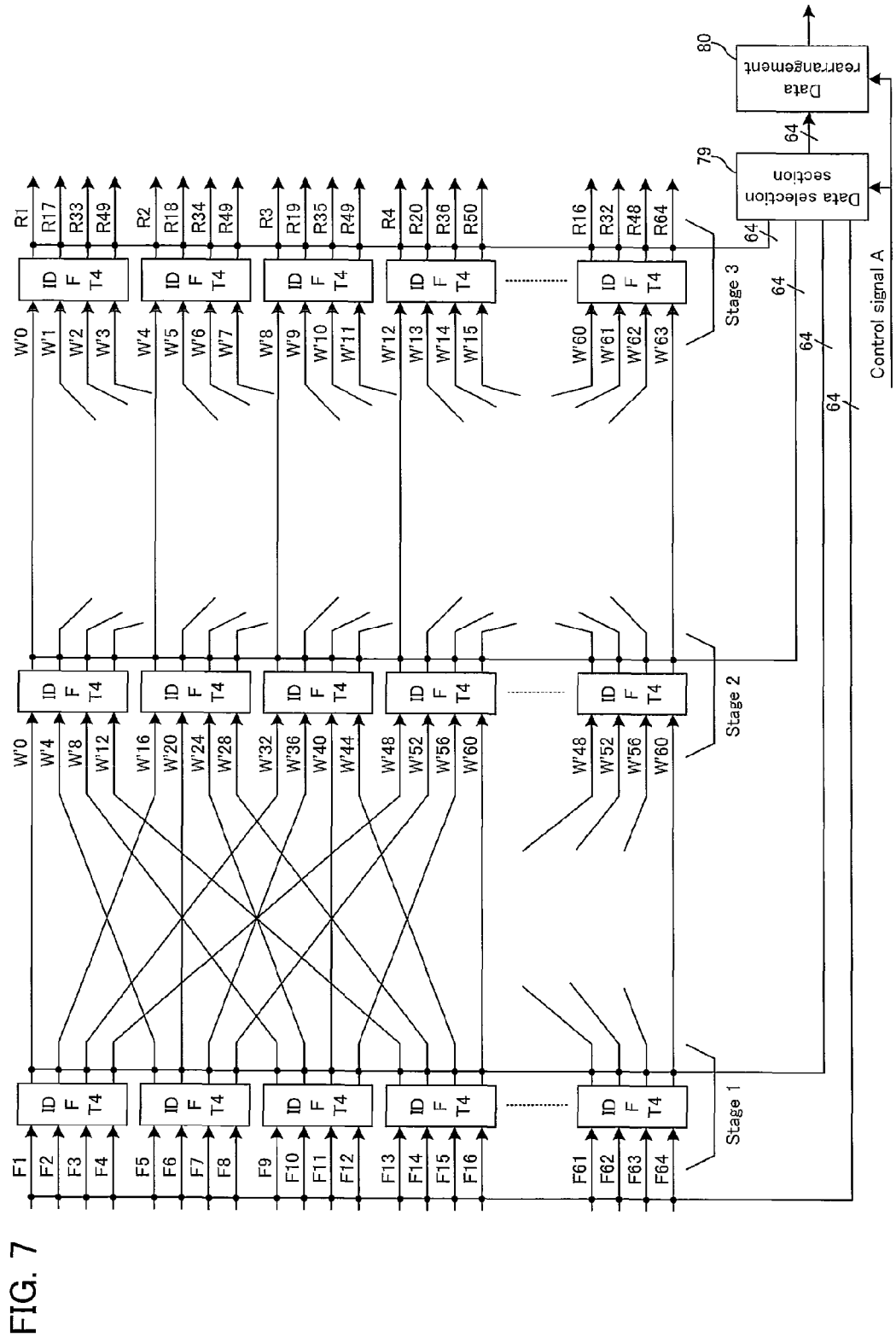
FIG. 7 illustrates a case that uses IDFT in the variable-SF inverse spreading section 68 shown in FIG. 6.

FIG. 7 illustrates a case that uses IDFT in the variable-SF inverse spreading section 68 of FIG. 6. This configuration is based on IDFT as in spreading, and IDFT can be realized with several butterfly operation units and memory. Since IDFT permits high-speed arithmetic processing, circuitry can be simplified as compared to conventional inverse spreading. While FIG. 7 illustrates frequency thinning method as an example, the configuration may also be realized by time thinning method.

FIG. 7 shows butterfly operation units with a radix of 4. While the figure shows that there are 16 butterfly operation units (denoted as IDFT4s in FIG. 7) per stage, that is to say, 16×3 (stages)=48 butterfly operation units for the sake of simplifying the following descriptions, as these butterfly operation units are of exactly the same structure, this configuration could be realized with at least one butterfly operation unit.

When its outputs are denoted as X1, X2, X3, X4 and inputs are as Y1, Y2, Y3, Y4, radix-4 butterfly operation is represented by Equation 3 below:

[Equation 3]

$$X1 = (Y1 + Y2 + Y3 + Y4)/4$$

$$X2 = (Y1 + jY2 - Y3 - jY4)/4$$

$$X3 = (Y1 - Y2 + Y3 - Y4)/4$$

$$X4 = (Y1 - jY - Y3 + jY4)/4 \quad (3)$$

Equation (3) is a solution of Equation (1) for X1, X2, X3 and X4. The IDFT4s in FIG. 7 are all operations represented by Equation (3). Also, on arrows indicating data flow between IDFT4s, signals are shown as Wa ("a" being a number). This "Wa" is a numerical value called a twiddle factor, to be multiplied to data flowing on each arrow. As there are 64 IDFT points in the present embodiment, the twiddle factor is defined by Equation (4):

[Equation 4]

$$Wa = e^{-j \times 2\pi \times \alpha / 64} \quad (4)$$

The variable-SF inverse spreading section 68 of FIG. 7 is composed of the data rearrangement section 80, the data selection section 79, and butterfly operation sections (IDFT4s).

Data input to the variable-SF inverse spreading section 68 of FIG. 7 is input to the data selection section 79, and selection of this data means selection of SF 1, namely the OFDM scheme. Then, IDFT processing in stage 1 is performed. Output of this stage corresponds to output, that is, an inverse spread value, for SF=4. Similarly, output of stage 2 corresponds to the inverse spread value for SF=16, and output of stage 3 to that for SF=64. The data rearrangement section 80 rearranges data. This is because it is necessary to rearrange data in accordance with SF, as, when Rk denotes received data, stage 1 outputs data in ascending order of R1, R2, R3, R4, F5 . . . , stage 2 outputs in the order of R1, R5, R9, R13, R2, R6 . . . , and stage 3 outputs in the order of R1, R17, R33, R49, R2, R18 . . . , which is also shown in the figure. This is based on the assumption that rearrangement is also performed on the transmission apparatus so that data is in the same positional relationship.

A receiver configuration having such a variable inverse spreading unit has the advantage of facilitating inverse spreading according to SF (Spreading Factor).

The present embodiment envisages downlink communication and a feature thereof is that it provides some steps between the OFDM and the single-carrier scheme. And it describes an exemplary circuit configuration that can realize the steps through the use of relationship between DFT (Discrete Fourier Transform) and SF (Spreading Factor).

Now, a second embodiment of the invention will be described with reference to drawings. The first embodiment described above is intended for use with services in a local area, which do not have to take interference into account, whereas the second embodiment envisages a one-frequency repeating system that will be used for communication over a pubic network in future. A one-frequency system is a system in which base stations constituting cells perform communication all using the same frequency band, and accordingly a significant issue thereof is securing of communication quality at a cell edge.

The aforementioned Non-Patent Document 1 discloses a method for reducing effect from other cells by performing spreading and multiplying a scrambling code in a cellular system. Spreading and scrambling are implemented in the frequency domain of OFDM signals. As described earlier, the Non-Patent Document 1 does not take PAPR into account. Nonetheless, the document shows that communication efficiency is improved by setting data efficiency (=multiplex number/SF) to about 0.25 and using scrambling so as to enable interference to be spread through inverse spreading on a receiver.

Since the first embodiment of the present invention performs spreading in frequency domain but sets data efficiency to 1, it cannot spread effect when an interference signal has a similar signal form, which leads to degradation in communication quality. This is because correlation becomes high due to use of the same spreading code in all cells that give rise to effect of interference. When considering interference alone, multiplication of a scrambling code is an option, which is also shown in the Non-Patent Document 1, but it significantly degrade PAPR characteristics of signals. The present embodiment shows a configuration of transmission and reception apparatuses that reduces effect of interference without degrading PAPR characteristics.

Figure 8:
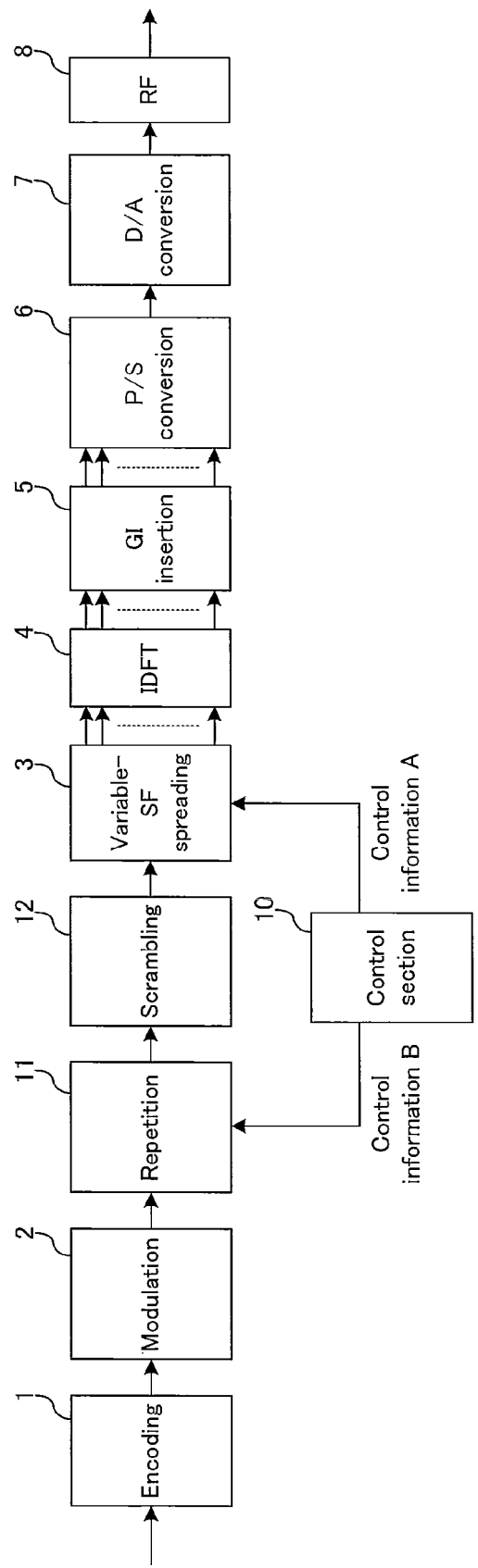
FIG. 8 is a functional block diagram showing an exemplary configuration of a transmission apparatus according to a second embodiment of the invention.

FIG. 8 is a functional block diagram showing an exemplary configuration of a transmission apparatus according to the second embodiment of the invention. In the figure, blocks having the same functions as those shown in FIG. 1 are given the same reference numerals. The transmission apparatus shown in FIG. 8 further includes a repetition section 11 and a scrambling section 12 in addition to the configuration of FIG. 1B. From the control section 10, control information B is input to the repetition section 11. The repetition section 11 has the capability of repeating an input signal a number of times specified in control signal B. The scrambling section 12 has the capability of scrambling input data with a random code. The scrambling capability can be realized by multiplying an input signal by ±1 randomly in a simplest case. A random signal for scrambling can be of any of various patterns, but is preferably one that has no correlation with neighboring base stations. Also, to avoid stationary errors, it is preferable to change the random signal for each packet or frame.

The data repetition section 11 and the scrambling section 12 enable interference to be spread on a receiver. In addition, by making the number of repetitions large, tolerance to interference is improved. The data repetition and scrambling do not change the data pattern of the primary modulation essentially. Consequently, PAPR characteristics become dependent on a SF specified in control information A, and setting SF to 64 can keep PAPR characteristics in a good condition (i.e., characteristics of 64CDM-OFDM in FIG. 4).

The data repetition section 11 can also multiplex data. For example, while the example above showed simple repetition by a designated number of times, odd-numbered pieces of data may be multiplied by an orthogonal code that is different from the one for even-numbered pieces of data and added before being scrambled. Such a method has an advantage in that loss of data rate resulting from repetition can be prevented to some extent, though PAPR characteristics are slightly degraded.

Figure 9:
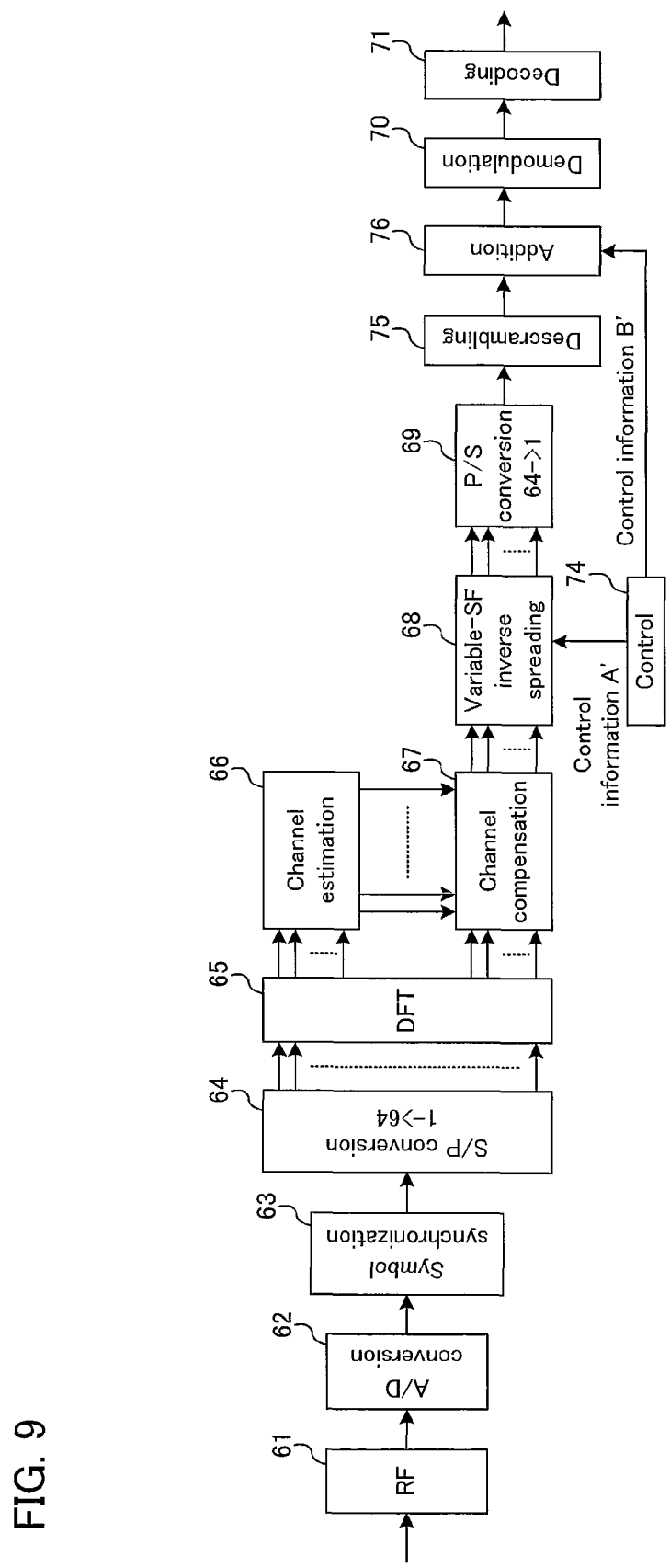
FIG. 9 is a functional block diagram showing an exemplary configuration of a reception apparatus according to the second embodiment.

FIG. 9 is a functional block diagram showing an exemplary configuration of a reception apparatus according to the present embodiment. In the figure, blocks having the same function as those shown in FIG. 6 are given the same reference numerals. This configuration further includes a descrambling section 75 and an addition section 76 in addition to the configuration of FIG. 6. Control information B' is input to the addition section 76 from the control section 74. The descrambling section 75 has the capability of descrambling input data with a random code. The random code can be realized by dividing the data by the random code used by the other end of communication. The addition section 76 performs addition of data according to control information B'. The number of pieces of data to be added is the same as the number of repetitions used on the sending side.

The descrambling and addition on the receiver can spread interference, providing the advantage of enabling highly accurate communication even in an area with high interference, such as at a cell edge.

While FIGS. 8 and 9 are described given an area with high interference, in an area with little interference, such as in the center of a cell, if repetition and scrambling on the sending side as well as descrambling and addition on the receiving side are not performed, the situation would correspond to the configuration shown in the first embodiment and the effects thereof could be obtained. In practice, there will be no problem if the number of repetitions is set to one, and whether scrambling is performed or not does not have a significant influence.

Next, a method for avoiding interference through processing in frequency domain will be shown. While the previous example spreads interference by repeating time domain data (i.e., output of the modulation section 2), the following example reduces interference by reducing the number of sub-carriers used and using sub-carriers at different positions.

Figure 10:
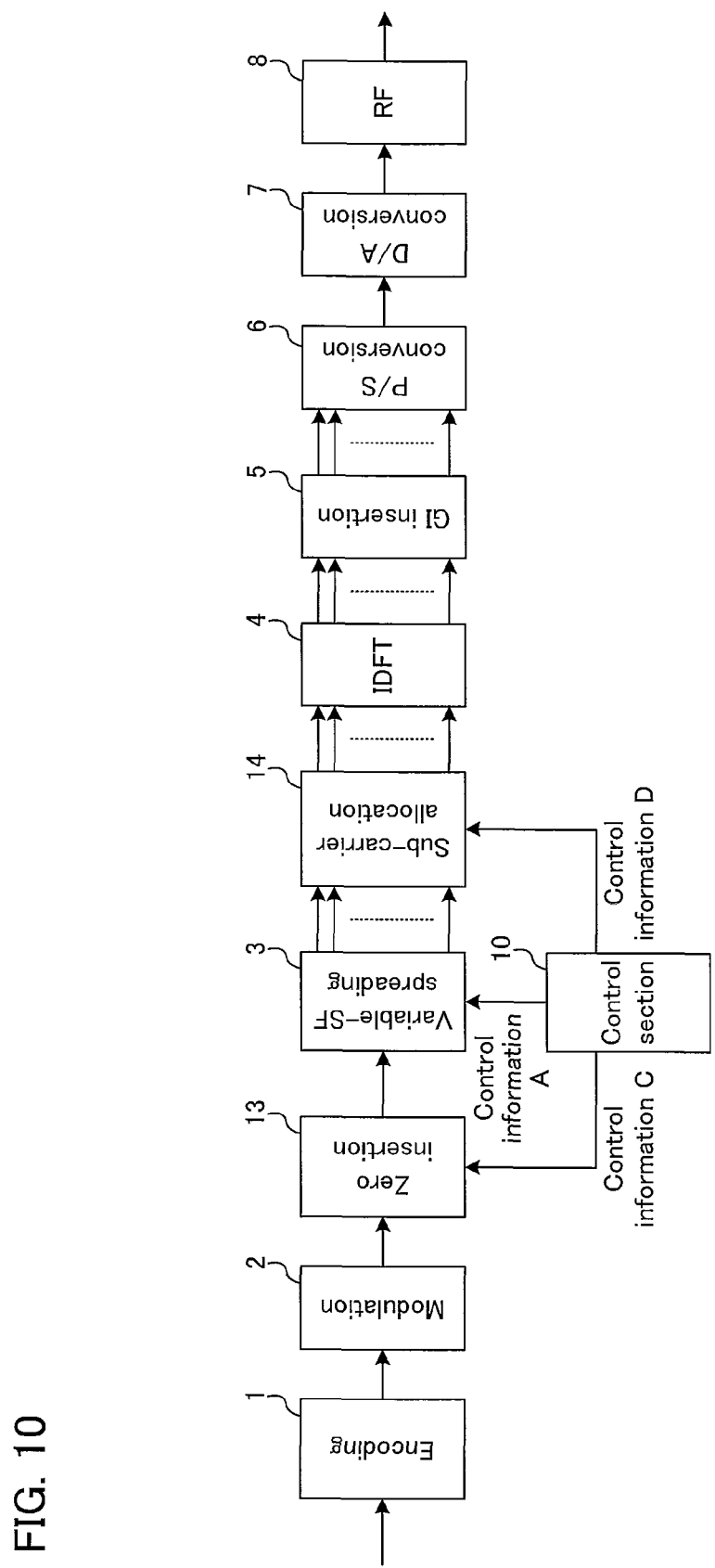
FIG. 10 is a functional block diagram showing an exemplary configuration of a transmission apparatus according to the second embodiment.

FIG. 10 is a functional block diagram showing an exemplary configuration of a transmission apparatus according to the present embodiment. In the figure, blocks having the same function as those in the functional block diagram of FIG. 1 are given the same reference numerals. The configuration further includes a zero-inserting section 13 and a sub-carrier allocation section 14 in addition to the configuration of FIG. 1. From the control section 10, control information C is input to the zero-inserting section 13 and control information D is to the sub-carrier allocation section 14.

Hereinafter, signal flow with a reduced number of sub-carriers used will be described. The zero-inserting section 13 inserts zeros in accordance with a number by which sub-carriers used are decreased. By way of example, as the present embodiment is described given 64 sub-carriers, when 16 sub-carriers are used, following input of 16 pieces of data from the modulation section 2, 48 pieces of "0" data are inserted in the zero-inserting section 13.

Control signal A is also changed in accordance with the number of sub-carriers used. When 16 sub-carriers are used, control signal A specifies a SF of 16 (i.e., makes the number of sub-carriers used equal to SF). With such signal processing, output of the variable-SF spreading section 3 consists of a sequence of 16 pieces of data followed by 48 consecutive zeros.

Because the present embodiment reduces the number of sub-carriers used, when the same electric power is used as when all the sub-carriers are used in terms of the entire band, transmission power per sub-carrier can be increased and hence effect of interference can be reduced.

In this case, characteristics can be further improved if the sub-carrier allocation section 14 selects sixteen consecutive sub-carriers having as little interference as possible and allocates those sub-carriers to output of the variable-SF spreading section 3. The allocation here is input to the sub-carrier allocation section 14 as control information D from the control section 10.

Effect of interference can be reduced by decreasing the number of sub-carriers used and selecting sub-carriers with low interference, but correlation still remains in interference because the situation where the same code is used for spreading as in other cells stays unchanged. Thus, a method for further reducing correlation of interference from other cells will be shown below.

This method is similar to the previous example up to insertion of zeros. Then, the sub-carrier allocation section 14 groups input data other than zeros. For example, as 16 pieces of input data have signals in the previous example, the 16 pieces of data are placed into four groups each having four pieces of data. Then, a sub-carrier with good quality is selected and allocated to each of the four groups. By making such a way of allocation, it is possible to increase the possibility that sub-carriers of good quality can be selected and to lower correlation of interference from other cells. This is because of data rearrangement performed at the time of inverse spreading on the receiver, which lowers correlation with rotation orthogonal codes used in other cells.

Figure 11:
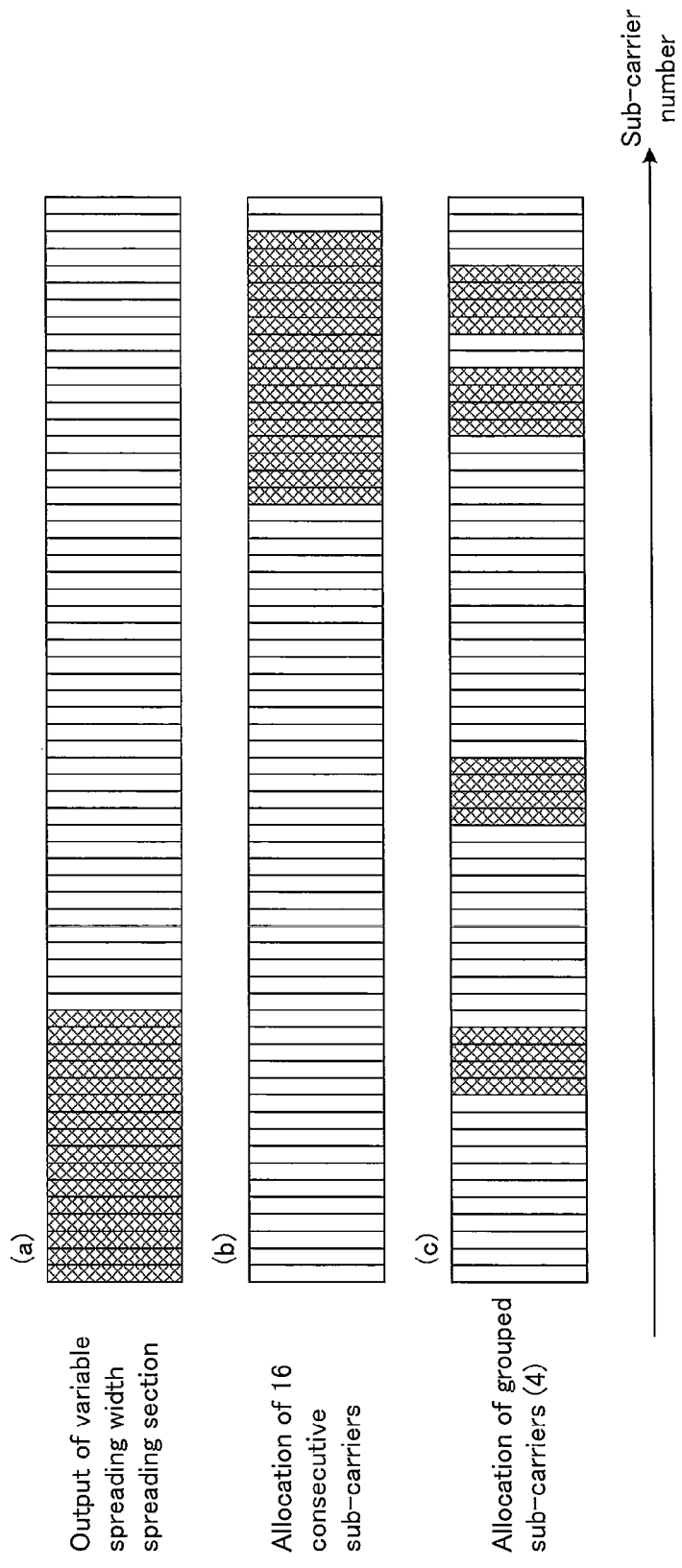
FIG. 11 shows examples of allocation to consecutive sub-carriers and allocation to groups of four sub-carriers.

FIG. 11 shows examples of allocation to consecutive sub-carriers and allocation to groups of four sub-carriers. In FIG. 11, the horizontal axis represents frequency and rectangles each represent one sub-carrier. Shaded squares represent sub-carriers that actually have signal power and plain squares represent sub-carriers to which no signal power is allocated.

FIG. 11(*a*) shows output from the variable-SF spreading section 3, which is also input to the sub-carrier allocation section 14. With control by the variable-SF spreading section 3, signal power concentrates in lower ranges in the frequency domain (i.e., the hatched area). The sub-carrier allocation section 14 performs allocation in accordance with control information D from the control section 10. FIG. 11(*b*) shows allocation to all consecutive 16 sub-carriers, and FIG. 11(*c*) shows allocation to groups of four sub-carriers.

By grouping fewer sub-carriers, it is possible to increase the possibility that sub-carriers of good quality can be selected as well as the effect of reducing the influence of interference, but PAPR characteristics call degrade more significantly.

Figure 12:
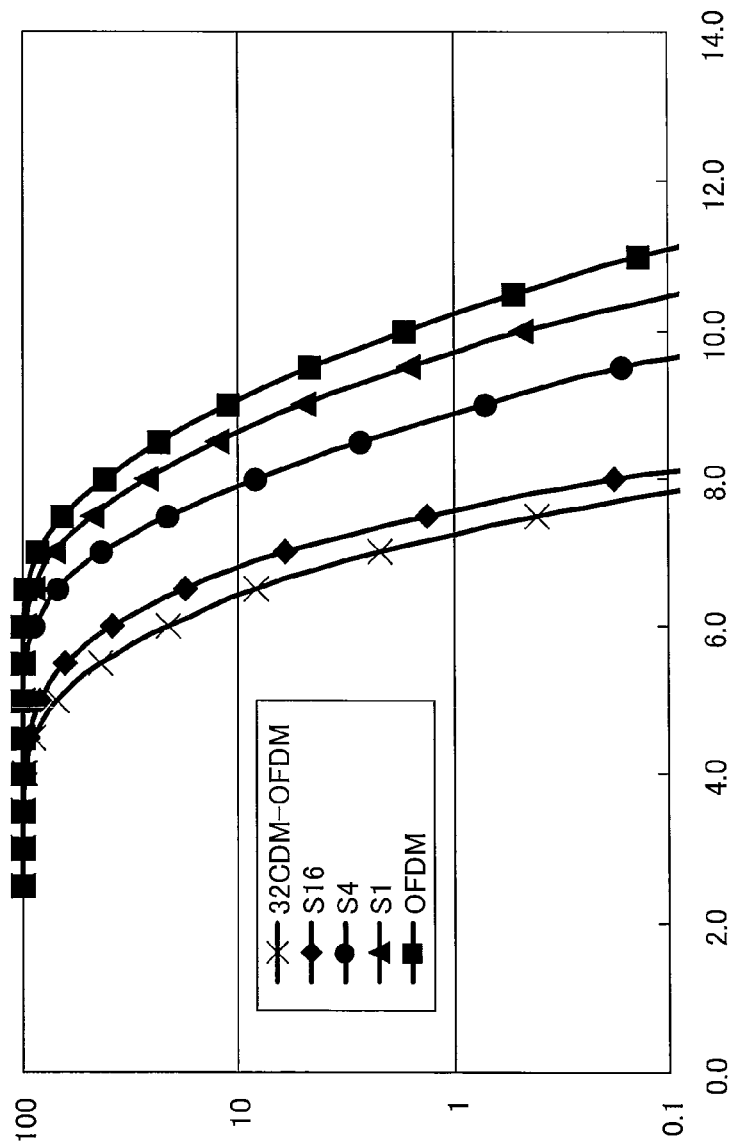
FIG. 12 illustrates PAPR characteristics obtained with various numbers of sub-carriers for grouping when the total number of sub-carriers is 64 as in the previous examples and 32 sub-carriers are used.

FIG. 12 illustrates PAPR characteristics obtained with various numbers of sub-carriers that are grouped when the total number of sub-carriers is 64 as in the previous examples and 32 sub-carriers are used. The vertical and horizontal axes represent the same as in FIG. 4. The value "1" in S1 in FIG. 12 indicates the number of sub-carriers to be grouped. This value being 1 means sub-carriers is not grouped. OFDM represents PAPR characteristics of an OFDM signal with 32 sub-carriers, and 32CDM-OFDM represents characteristics obtained when 32 sub-carriers are consecutively arranged. With such grouping, although there is degradation in PAPR characteristics, when four sub-carriers are grouped (S4), degradation in PAPR characteristics is as small as about 1.5 dB by comparison even at PAPR characteristics of 1% (i.e., comparison at "1" on the vertical axis of the plot). It thus proves to have the effect of power reduction and hence is sufficiently applicable to communication to a cell edge.

Figure 13:
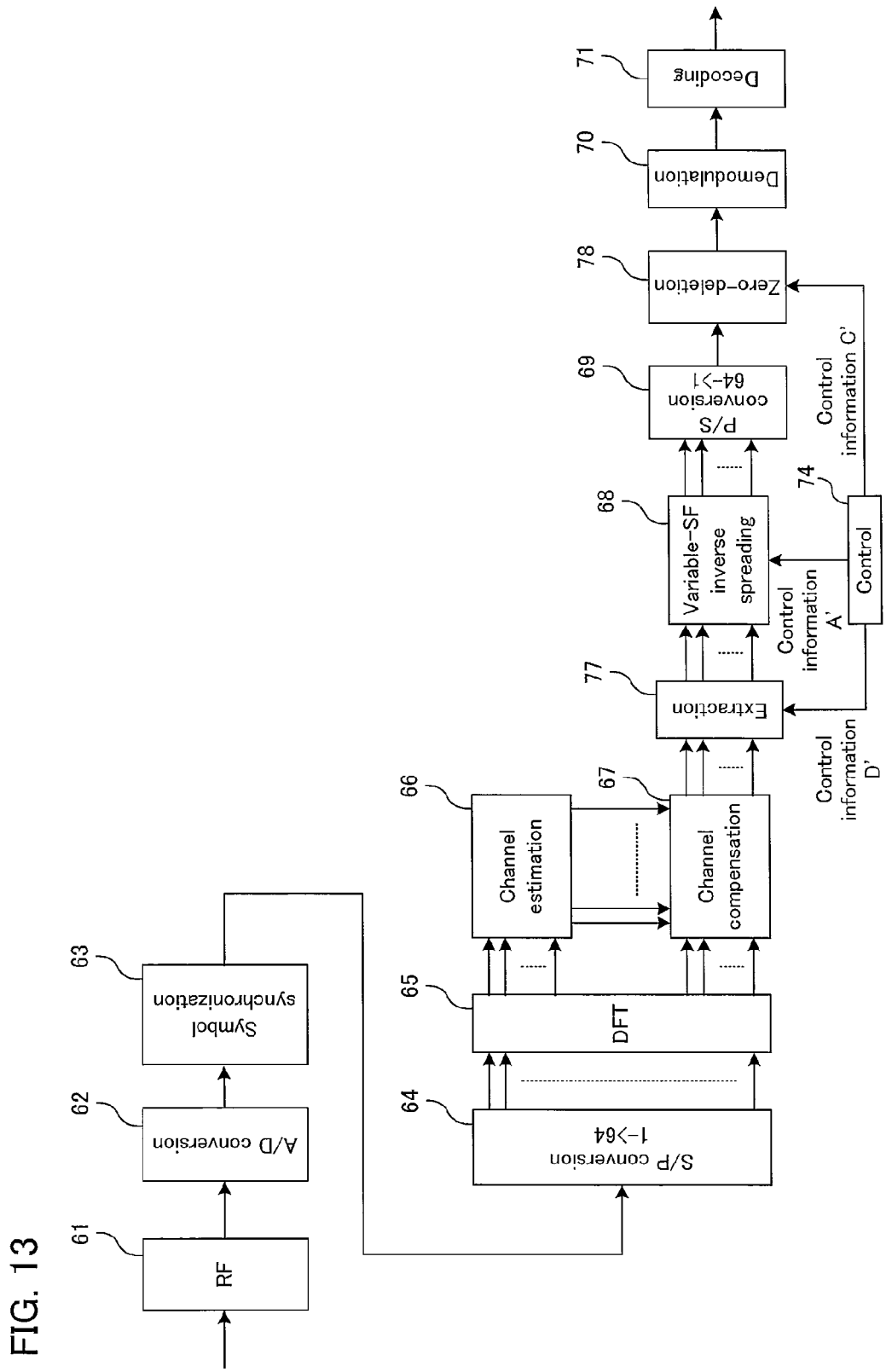
FIG. 13 is a functional block diagram showing an exemplary configuration of a reception apparatus according to the second embodiment.

FIG. 13 is a functional block diagram showing an exemplary configuration of a reception apparatus according to the present embodiment. In the figure, blocks having the same function as those shown in FIG. 9 are given the same reference numerals. This configuration further includes an extraction section 77 and a zero-deleting section 78 in addition to the configuration of FIG. 9. From the control section 74, control information C' is input to the zero-deleting section 78 and control information D' is to the extraction section 77.

Hereinafter, signal flow of when a reduced number of sub-carriers are used will be described.

The extraction section 77 extracts sub-carriers to which power has been allocated on the transmission apparatus in accordance with control information D'. This means extraction of signals on the shaded sub-carriers shown in FIG. 11(*b*) or 11(*c*). The extraction section 77 further has the capability to input the extracted signals to the IDFT section (variable-SF inverse spreading section) 68 such that the signals gather in lower ranges in IDFT input, meaning that signals are input as illustrated in FIG. 11(*a*). The variable-SF inverse spreading section 68 sets SF in accordance with the number of sub-carriers being used. Thereafter, the zero-deleting section 78 deletes irrelevant data. Thus, these sections have the reverse functions to those of the transmission apparatus.

As described above, the present embodiment can lower interference correlation associated with use of the same spreading code by rearranging, on the receiver, sub-carriers to which signals have been allocated. It therefore has the advantage of enabling highly accurate communication even in an area with high interference, such as at a cell edge.

Now, a communication technique according to a third embodiment of the invention will be described with reference to drawings. The third embodiment of the invention is an example of application of the CDM-OFDM signal shown in the first or second embodiment to an OFDMA system. While the first and second embodiments showed an OFDM system with 64 sub-carriers, the present embodiment forms an OFDMA system regarding the OFDM system as one frequency sub-channel. Such a system is called herein a CDM-OFDMA system. The present embodiment shows a case with 12 sub-channels, in which case there are 64×12=768 sub-carriers in total.

Figure 14:
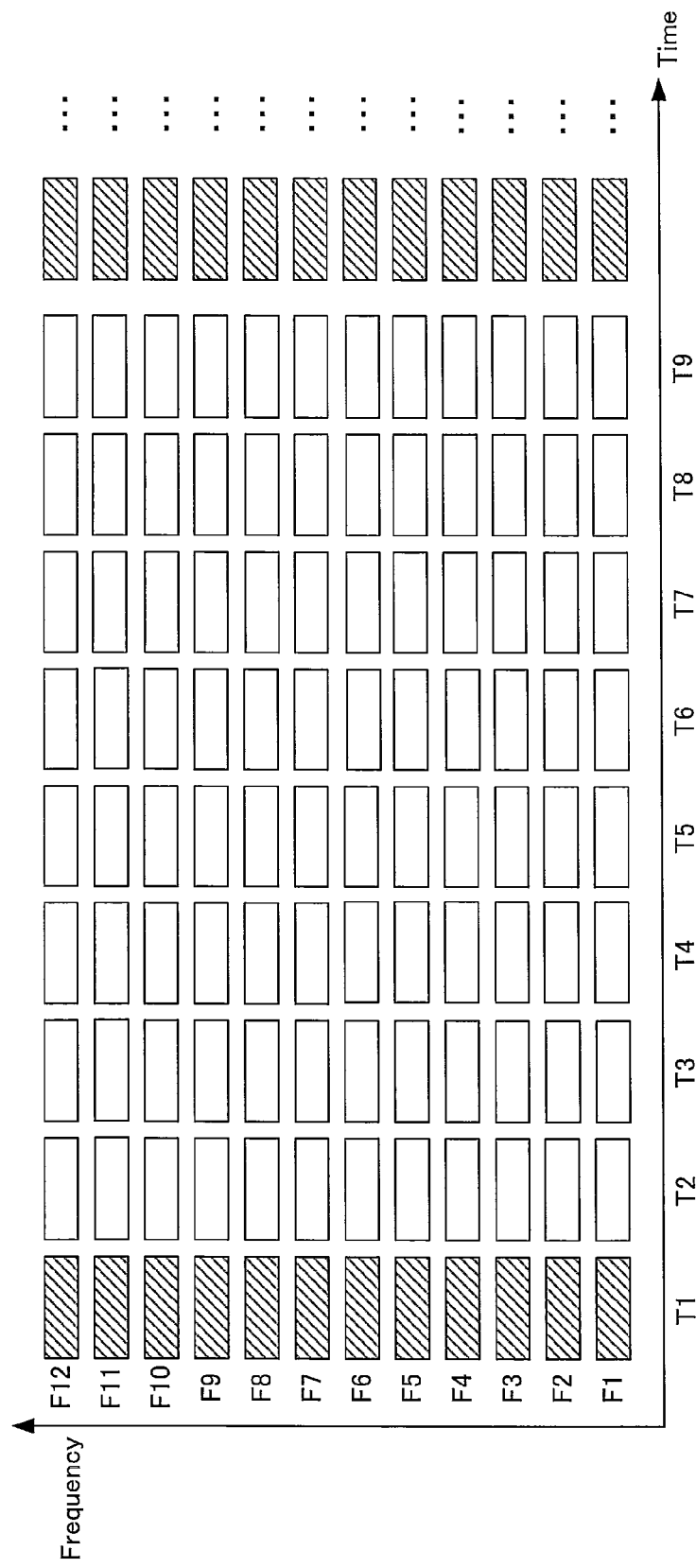
FIG. 14 shows an example of a frame format for use in the second embodiment.

FIG. 14 shows an example of a frame format for use in the present embodiment. In the figure, the vertical axis represents frequency and the horizontal axis represents time. On the frequency axis, there are frequency sub-channels from F1 to F12, and on the time axis, there are time sub-channels from T1 to T9. Although space is present between sub-channels, it does not mean that sub-carriers or time that is not actually used is necessary. In FIG. 14, the twelve frequency sub-channels F1 through F12 and nine time sub-channels T1 through T9 constitute one frame, by repeating which, a base station and a terminal station communicate with each other. When a unit composed of frequency sub-channels and time sub-channels is called a slot, slots are allocated when communication is performed and the base station and the terminal station communicate in those slots. Also, a time sub-channel made up of T1 and F1 through F12 (the shaded slot in FIG. 14) is a frame in which information regarding the structure of the frame or the like is transmitted as control information and which needs to send data to the entire cell.

Figure 15:
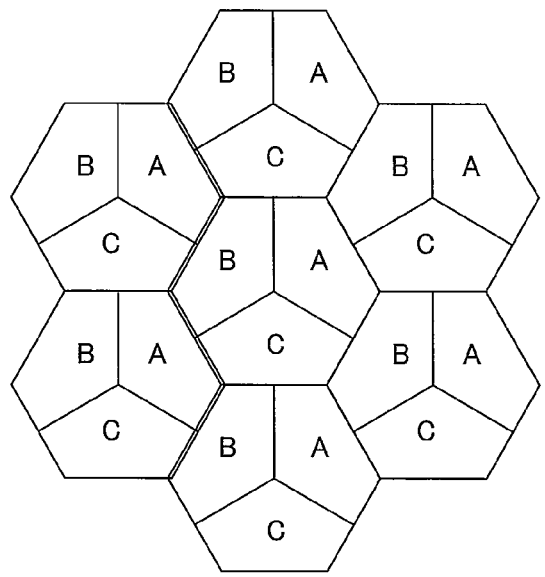
FIG. 15 shows an example of cell layout for communication in which each cell is divided into three areas, A, B, and C.

FIG. 15 shows an example of cell layout for communication in which each cell is divided into three areas, A, B, and C. The areas A to C formed by such division of a cell are called sectors, and all the sectors use the same frequency. In FIG. 15, however, areas are arranged such that the same area is not specified in neighboring sectors. When interference is taken into consideration in this situation, an area represented by a certain symbol will be affected most by signals from areas represented by the other symbols than that symbol. That is to say, sector A is affected most by sectors B and C.

In such a cell layout, when in sector A, for example, a user wants to communicate with a terminal that is positioned at a cell edge, it is desirable that signal power, that is, interference power, of sectors B and C is small. By positioning signals so as to form such a condition, interference can be reduced. Hereinafter, a method in which each sector or cell considers transmission power of other cells or sectors so that each other's interference power is minimized will be called interference coordination.

Figure 16:
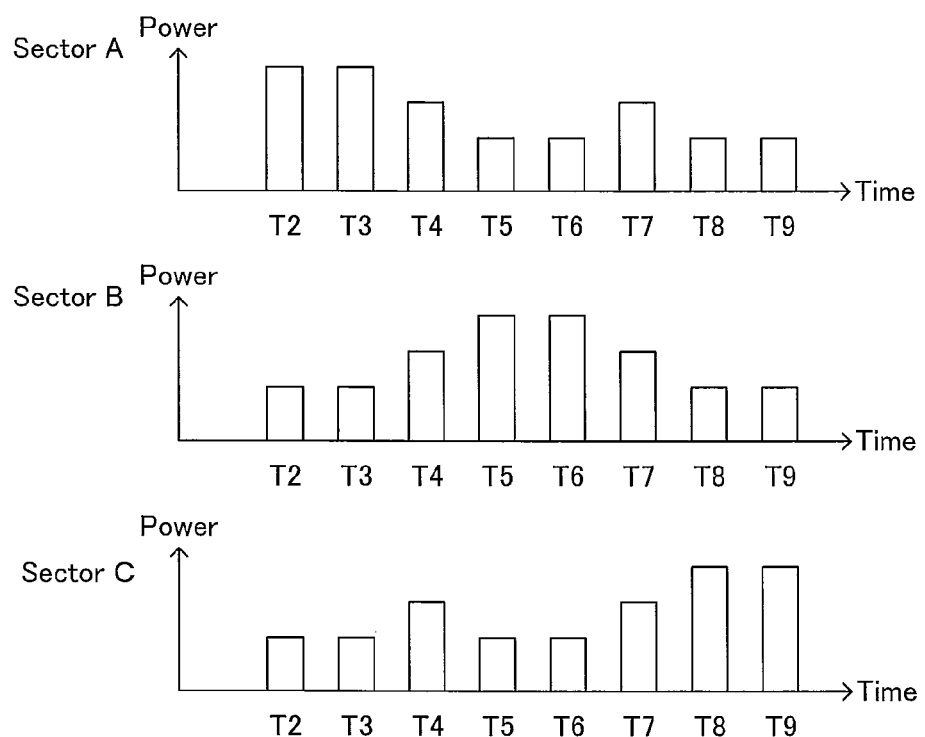
FIG. 16 shows variations in transmission power in individual sectors with time interference coordination effected.

FIG. 16 shows variations in transmission power in individual sectors with time interference coordination effected. As the plots are based on the frame format shown in FIG. 14, time sub-channels available for data communication are eight time sub-channels T2 to T9. FIG. 16 shows an example in which each sector has two, four, and two time sub-channels for the maximum, minimum, and medium transmission power, respectively, and the transmission power of the sector is controlled to be minimized while data is transmitted at the maximum transmission power in other sectors. By thus implementing interference coordination, interference between sectors can be reduced. Interference coordination can also be realized by using frequency sub-channels. However, interference coordination is desirably performed using time sub-channels in the present embodiment because the embodiment uses rotation orthogonal codes as orthogonal codes and considers reduction of PAPR in a CDM-OFDM system.

In FIG. 16, in time sub-channels in which data is transmitted at the maximum transmission power (e.g., T2 and T3 of sector A), SF is set to 64 in all frequency sub-channels. Thereby, PAPR degradation can be controlled. This because excellent PAPR characteristics are obtained when SF is 64 in CDM-OFDM signals as shown in the first embodiment. Typically, PAPR characteristics of OFDM signals degrade as the number of sub-carriers increases. Therefore, PAPR degradation can be prevented by carrying out interference coordination on time sub-channels and performing spreading with the same SF on individual frequency sub-channels, as shown in this embodiment.

In FIG. 16, SF is set to 16 for time sub-channels on which data is transmitted at a medium transmission power and to 1 for time sub-channels on which data is transmitted at the minimum transmission power. As to T1 frame, it is premised that control information is received by all terminals as mentioned above. Therefore, it is not preferable to lower its transmission power. It is not preferable either to change time sub-channels targeted for interference coordination (i.e., not desirable to change the position of time sub-channels among sectors) when considering handover between sectors. Therefore, the method of reducing the sub-carriers used and spreading interference by way of arrangement of sub-carriers used should be adopted as shown in the second embodiment.

Figure 17:
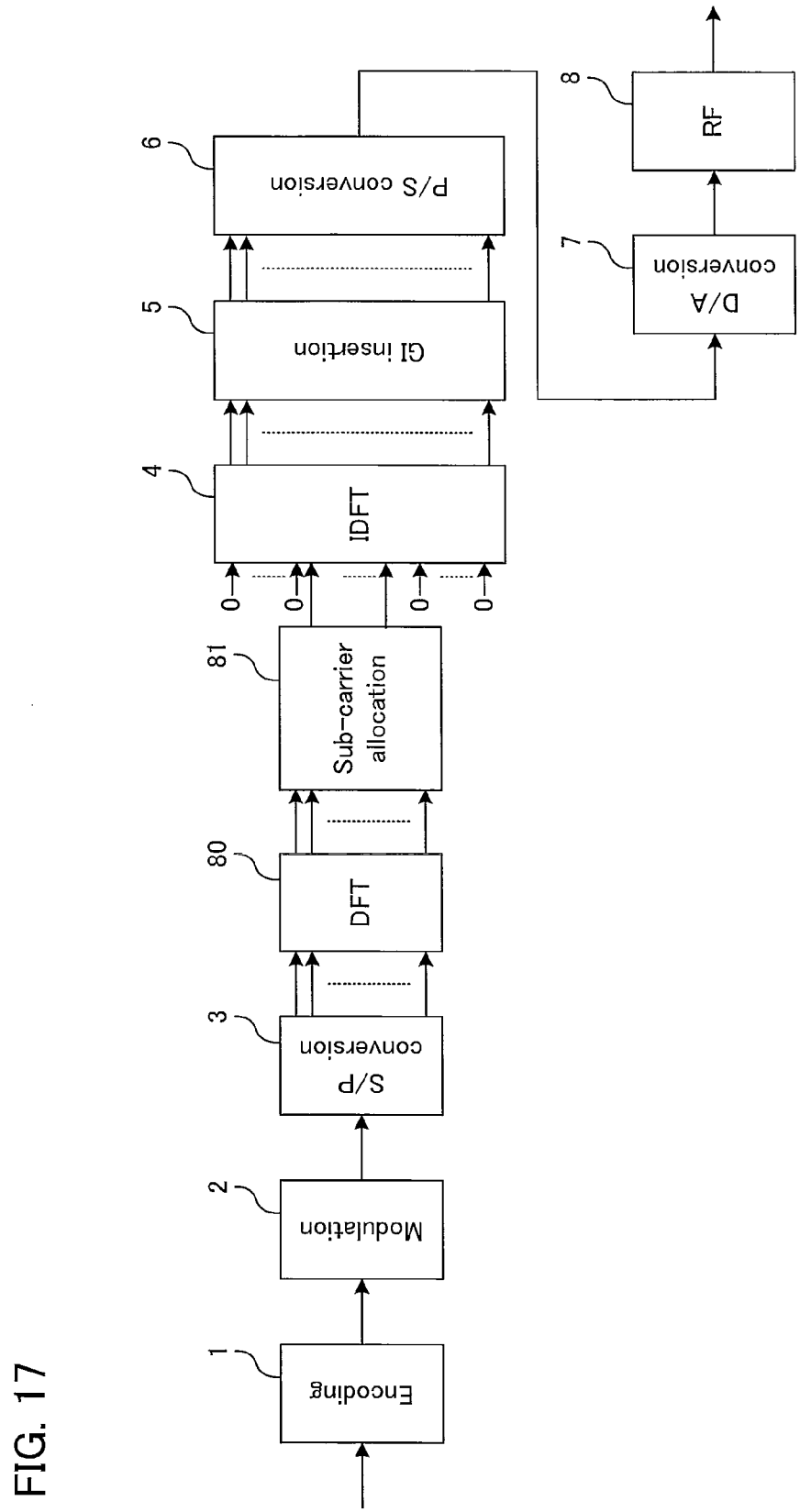
FIG. 17 is a functional block diagram showing an exemplary configuration of a DFT-s-OFDM transmitter.

Next, a communication technique according to a fourth embodiment of the invention will be described with reference to drawings. Its circuit configuration using DFT, which was shown in the first embodiment, is almost the same as that for the DFT-s-OFDM (DFT-spread-OFDM) communication scheme. FIG. 17 is a functional block diagram showing an exemplary configuration of a DFT-s-OFDM transmitter. In the figure, blocks having the same function as those of the transmitter of FIG. 2 are given the same reference numerals. In FIG. 17, reference numeral 80 denotes a DFT section for performing time-frequency conversion, and 81 denotes a sub-carrier allocation section that selects and allocates sub-carriers. The DFT-s-OFDM communication scheme has good PAPR characteristics as a modulation scheme for single carrier and has been proposed for use as the communication scheme for uplink. As can be understood from the configuration, it is the same configuration as the CDM-OFDM system using rotation orthogonal codes shown in the first embodiment if SF is made equal to the number of sub-carriers. However, as this embodiment is intended for use in uplink, it envisages multiplexing with other terminals through FDM (Frequency Division Multiplexing). Therefore, the sub-carrier allocation section 81 is inserted as a block that selects sub-carriers for use in transmission.

Consequently, the reception apparatus shown in the first embodiment would be able to demodulate signals generated in the DFT-s-OFDM communication scheme if constraints such as timing permit. It therefore means that if DFT-s-OFDM is used as the communication scheme for uplink in a system that uses the transmission scheme shown in the first embodiment (i.e., CDM-OFDM using rotation orthogonal codes) in downlink, a terminal capable of connecting to a base station is enabled to communicate with other terminals as well, meaning that retransmission by mobile terminals can be easily realized.

Figure 18:
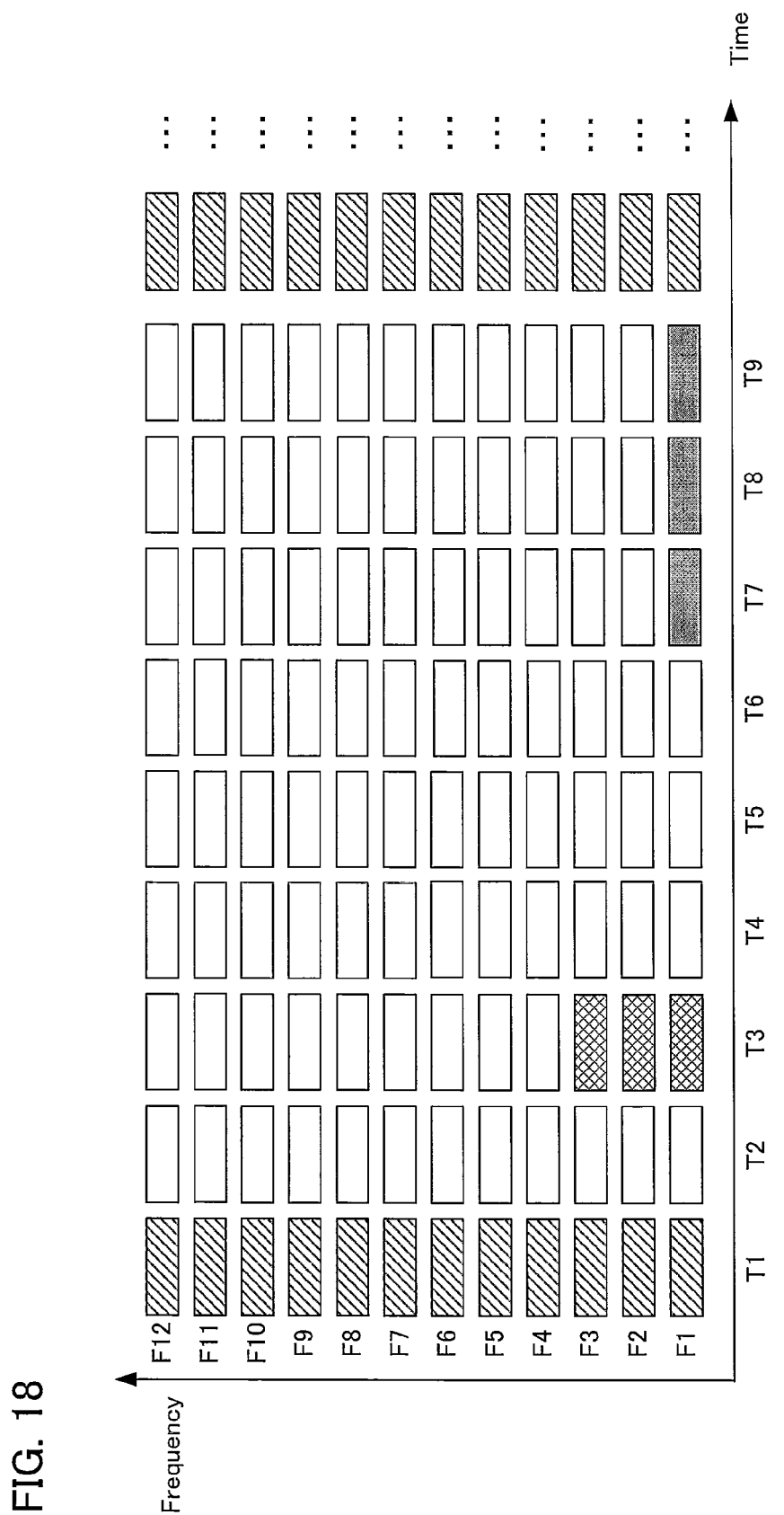
FIG. 18 shows an example of a frame format for use when relay is performed.

As a specific example, downlink communication between the base station and terminal station B in which terminal A relays data will be described given the OFDMA system shown in the third embodiment. FIG. 18 shows an example of a frame format for use when relay is performed, where slots F1 to F3 at T3 (the cross-hatched slots) are slots allocated to communication from the base station to terminal A and slots T7 to T9 at F1 (the gray slots) are slots allocated to communication from terminal A to terminal B. It is assumed here that the base station does not perform transmission in slots T7 to T9 at F1.

From the base station to terminal A, data destined for terminal B is transmitted. For this transmission, there is no particular SF that is optimal, and any scheme may be used as long as terminal A can receive the data. However, to complete retransmission within the same frame, transmission of the data preferably finishes at an early stage in the frame (i.e., a stage with a smaller time sub-channel number). Therefore, the present embodiment completes the transmission at T3 using multiple sub-channels as mentioned above. The terminal A demodulates the received data, and transmits the data to terminal B using the communication scheme for uplink, namely DFT-s-OFDM (the transmitter shown in FIG. 17). In general, high-output amplifiers used in terminals are often inferior in performance to those of base stations. Thus, to minimize degradation in PAPR characteristics, it is preferable to a use fewer sub-carriers. The present embodiment therefore uses sub-carriers equivalent to one sub-channel of downlink (64 sub-carriers) to transmit DFT-s-OFDM signals.

Accordingly, the base station allocates the slots T7 to T9 of F1 to communication from terminal A to terminal B. Terminal B demodulates data setting SF to 64 with the reception scheme for downlink. However, when FDD (Frequency Division Duplex) is used in uplink and downlink, it is necessary to change RF frequency to the downlink frequency during communication from terminal A to terminal B.

As described, in a cellular system or the like, by using CDM-OFDM that employs rotation orthogonal codes as the communication scheme for one direction and DFT-s-OFDM as that for the other direction, retransmission by terminals becomes possible without having to further prepare a demodulation circuit and the like.

INDUSTRIAL APPLICABILITY

The present invention is applicable to communication apparatuses.

The invention claimed is:

1. An OFDM transmission apparatus comprising:
a variable-spreading-factor spreading section configured to perform discrete Fourier transform on data signals to generate n sets of spread signals, n being a value equal to or greater than 1;
a sub-carrier allocation section configured to allocate said n sets of spread signals to a plurality of sub-carriers;
an inverse discrete Fourier transform section configured to perform inverse discrete Fourier transform on said n sets of spread signals allocated; and
a control section configured to control, according to the value of n, a limit of a power for transmitting IDFT transformed said n sets of spread signals, wherein
the control section is further configured to control the limit of the power in a case that the value of n is equal to or greater than a value of 2 to be smaller than the limit of the power in a case that the value of n is equal to 1.

2. The OFDM transmission apparatus according to claim 1, wherein the limit of the power is modified by a modification value.

3. The OFDM transmission apparatus according to claim 1, wherein in a case that the value of n is equal to or greater than a value of 2, the sub-carrier allocation section is further configured to allocate each of two or more sets of spreading signals of said n sets of spread signals to the plurality of sub-carriers, respectively.

4. The OFDM transmission apparatus according to claim 1, wherein the control section is configured to control the limit of the power so that the limit of the power for transmitting IDFT transformed said n sets of spread signals is a first limit based on the value of n being equal to or greater than a value of 2 and a second limit based on the value of n being equal to 1, and
wherein the first limit is a limit less than the second limit.

5. An OFDM transmission method comprising:
performing discrete Fourier transform on data signals to generate n sets of spread signals, n being a value equal to or greater than 1;
allocating said n sets of spread signals to a plurality of sub-carriers;
performing inverse discrete Fourier transform on said n sets of spread signals allocated;
controlling, according to the value of n, a limit of a power for transmitting IDFT transformed said n sets of spread signals, in order that the limit of the power in a case that the value of n is equal to or greater than a value of 2 to be smaller than the limit of the power in a case that the value of n is equal to 1.

6. A wireless communication system comprising:
a reception apparatus; and
an OFDM transmission apparatus,
wherein the OFDM transmission apparatus comprises:
a variable-spreading-factor spreading section configured to perform discrete Fourier transform on data signals to generate n sets of spread signals, n being a value equal to or greater than 1;
a sub-carrier allocation section configured to allocate said n sets of spread signals to a plurality of sub-carriers;
an inverse discrete Fourier transform section configured to perform inverse discrete Fourier transform on said n sets of spread signals allocated; and
a control section configured to control, according to the value of n, a limit of a power for transmitting IDFT transformed said n sets of spread signals, wherein
the control section is further configured to control the limit of the power in a case that the value of n is equal to or greater than a value of 2 to be smaller than the limit of the power in a case that the value of n is equal to 1, and
the reception apparatus comprises:
an RF unit configured to receive IDFT transformed said n sets of spread signals transmitted from the OFDM transmission apparatus.

7. A non-transitory computer-readable medium having instructions stored thereon, such that when the instructions are read and executed by processor, the processor is configured to:
perform a discrete Fourier transform on data signals to generate n sets of spread signals, n being a value equal to or greater than 1;
allocate said n sets of spread signals to a plurality of sub-carriers;
perform an inverse discrete Fourier transform on said n sets of spread signals allocated;
control, according to the value of n, a limit of a power for transmitting IDFT transformed said n sets of spread signals in order that the limit of the power in a case that the value of n is equal to or greater than a value of 2 to be smaller than the limit of the power in a case that the value of n is equal to 1.

* * * * *